United States Patent
Nishimaki

(10) Patent No.: US 12,079,249 B2
(45) Date of Patent: Sep. 3, 2024

(54) NON-TRANSITORY COMPUTER-READABLE STORAGE MEDIUM, MANAGEMENT METHOD, AND MANAGEMENT DEVICE

(71) Applicant: FUJITSU LIMITED, Kawasaki (JP)

(72) Inventor: Satoru Nishimaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 126 days.

(21) Appl. No.: 17/718,371

(22) Filed: Apr. 12, 2022

(65) Prior Publication Data

US 2023/0014047 A1    Jan. 19, 2023

(30) Foreign Application Priority Data

Jul. 13, 2021    (JP) ................................ 2021-115729

(51) Int. Cl.
   *G06F 17/00*    (2019.01)
   *G06F 16/22*    (2019.01)
   *G06F 16/23*    (2019.01)
   *G06F 16/28*    (2019.01)

(52) U.S. Cl.
   CPC ........ *G06F 16/288* (2019.01); *G06F 16/2282* (2019.01); *G06F 16/2358* (2019.01)

(58) Field of Classification Search
   CPC ............... G06F 16/288; G06F 16/2282; G06F 16/2358; Y02P 90/30; G06Q 10/0838; G06Q 10/087
   See application file for complete search history.

(56) References Cited

U.S. PATENT DOCUMENTS

| | | | |
|---|---|---|---|
| 11,762,836 B2* | 9/2023 | Vasudevan | G06F 16/2358 |
| | | | 707/690 |
| 2003/0033179 A1* | 2/2003 | Katz | G06Q 10/0631 |
| | | | 705/7.41 |
| 2004/0073665 A1 | 4/2004 | Fujiwara et al. | |
| 2007/0185924 A1* | 8/2007 | Kawamura | G06F 16/2358 |
| 2008/0054834 A1 | 3/2008 | Nakamura | |

(Continued)

FOREIGN PATENT DOCUMENTS

| | | |
|---|---|---|
| JP | 2004-133763 A | 4/2004 |
| JP | 2008-059362 A | 3/2008 |

OTHER PUBLICATIONS

Extended European Search Report dated Sep. 1, 2022 for corresponding European Patent Application No. 22166891.6, 7 pages.

(Continued)

*Primary Examiner* — Greta L Robinson
(74) *Attorney, Agent, or Firm* — Fujitsu Intellectual Property Center

(57) ABSTRACT

A non-transitory computer-readable storage medium storing a management program that causes a processor included in a computer to execute a process, the process includes extracting data identification information that identifies monitoring target data from instruction log data, the instruction log data being recorded operation for the monitoring target data to be monitored, and storing, in a memory, the data identification information and history identification information that identifies history data in association with each other, the history data indicating a history of the operation for the monitoring target data.

6 Claims, 32 Drawing Sheets

(56) References Cited

U.S. PATENT DOCUMENTS

2009/0299781 A1* 12/2009 Dattathreya ........... G06Q 40/12
            705/40
2017/0206235 A1* 7/2017 Karandikar ........... G06F 16/248
2019/0208014 A1* 7/2019 Goldberg .............. G06F 16/185
2019/0213543 A1   7/2019 Sugaya

OTHER PUBLICATIONS

European Office Action dated Nov. 6, 2023 for corresponding European Patent Application No. 22166891.6, 6 pages.

* cited by examiner

FIG. 6A

| BARCODE ID | ITEM ID | ITEM NAME | QUANTITY | STATUS |
|---|---|---|---|---|
| — | — | — | — | — |

| DATA ID | HISTORY ID |
|---|---|
| — | — |

| HISTORY ID | PREVIOUS HISTORY ID | CORRESPONDING MANAGEMENT DATA |
|---|---|---|
| — | — | — |

```
...
2021-02-01T06:18:10.044313Z   Query INSERT INTO PRODUCTION
MANAGEMENT TABLE (BARCODE ID, ITEM ID, ITEM NAME, QUANTITY, STATUS)
VALUES ('A1', 'X1', 'PRODUCT X1', 200, 'PRODUCTION')

2021-02-01T06:18:10.045899Z Query INSERT INTO PRODUCTION MANAGEMENT
TABLE (BARCODE ID, ITEM ID, ITEM NAME, QUANTITY, STATUS) VALUES ('A2',
'X2', 'PRODUCT X2', 300, 'PRODUCTION')

2021-02-01T06:18:10.057361Z Query INSERT INTO USER MANAGEMENT TABLE
(USER ID, GENDER, AGE, ADDRESS) VALUES ('user 1','*','*','*')
...
```

11-1: first entry
11-2: second entry
11: block

FIG. 9A 120-1

| BARCODE ID | ITEM ID | ITEM NAME | QUANTITY | STATUS |
|---|---|---|---|---|
| A1 | X1 | PRODUCT X1 | 200 | PRODUCTION |
| A2 | X2 | PRODUCT X2 | 300 | PRODUCTION |

FIG. 9B 310-1

| DATA ID | HISTORY ID |
|---|---|
| A1 | T1 |
| A2 | T2 |

FIG. 9C 210-1

| HISTORY ID | PREVIOUS HISTORY ID | CORRESPONDING MANAGEMENT DATA |
|---|---|---|
| T1 | – | {"ITEM ID": "X1", "ITEM NAME": "PRODUCT X1", "QUANTITY": "200", "STATUS": "PRODUCTION"} |
| T2 | – | {"ITEM ID": "X2", "ITEM NAME": "PRODUCT X2", "QUANTITY": "300", "STATUS": "PRODUCTION"} |

FIG. 10
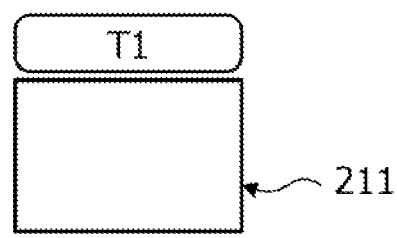
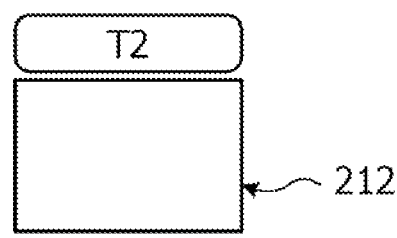

FIG. 11

11-3: 2021-02-02T06:18:10.044313Z Query INSERT INTO PRODUCTION MANAGEMENT TABLE (BARCODE ID, ITEM ID, ITEM NAME, QUANTITY, STATUS) VALUES ('A3', 'X1', 'PRODUCT X1', 100, 'PRODUCTION')

11-1a: 2021-02-02T06:18:10.045899Z Query INSERT INTO PRODUCTION MANAGEMENT TABLE (BARCODE ID, ITEM ID, ITEM NAME, QUANTITY, STATUS) VALUES ('A1', 'X1', 'PRODUCT X1', 50, 'SHIPMENT')

FIG. 12A 120-2

| BARCODE ID | ITEM ID | ITEM NAME | QUANTITY | STATUS |
|---|---|---|---|---|
| A1 | X1 | PRODUCT X1 | 50 | SHIPMENT |
| A2 | X2 | PRODUCT X2 | 300 | PRODUCTION |
| A3 | X1 | PRODUCT X1 | 100 | PRODUCTION |

FIG. 12B 310-2

| DATA ID | HISTORY ID |
|---|---|
| A1 | T4 |
| A2 | T2 |
| A3 | T3 |

FIG. 12C 210-2

| HISTORY ID | PREVIOUS HISTORY ID | CORRESPONDING MANAGEMENT DATA |
|---|---|---|
| T1 | – | {"ITEM ID": "X1", "ITEM NAME": "PRODUCT X1", "QUANTITY": "200", "STATUS": "PRODUCTION"} |
| T2 | – | {"ITEM ID": "X2", "ITEM NAME": "PRODUCT X2", "QUANTITY": "300", "STATUS": "PRODUCTION"} |
| T3 | – | {"ITEM ID": "X1", "ITEM NAME": "PRODUCT X1", "QUANTITY": "100", "STATUS": "PRODUCTION"} |
| T4 | T1 | {"ITEM ID": "X1", "ITEM NAME": "PRODUCT X1", "QUANTITY": "50", "STATUS": "SHIPMENT"} |

FIG. 18A

| BARCODE ID | ITEM ID | ITEM NAME | QUANTITY | STATUS |
|---|---|---|---|---|
| A1 | X1 | PRODUCT X1 | 200 | PRODUCTION |

| DATA ID | HISTORY ID |
|---|---|
| A1 | T1 |

310-1A

HISTORY OF DATA A1

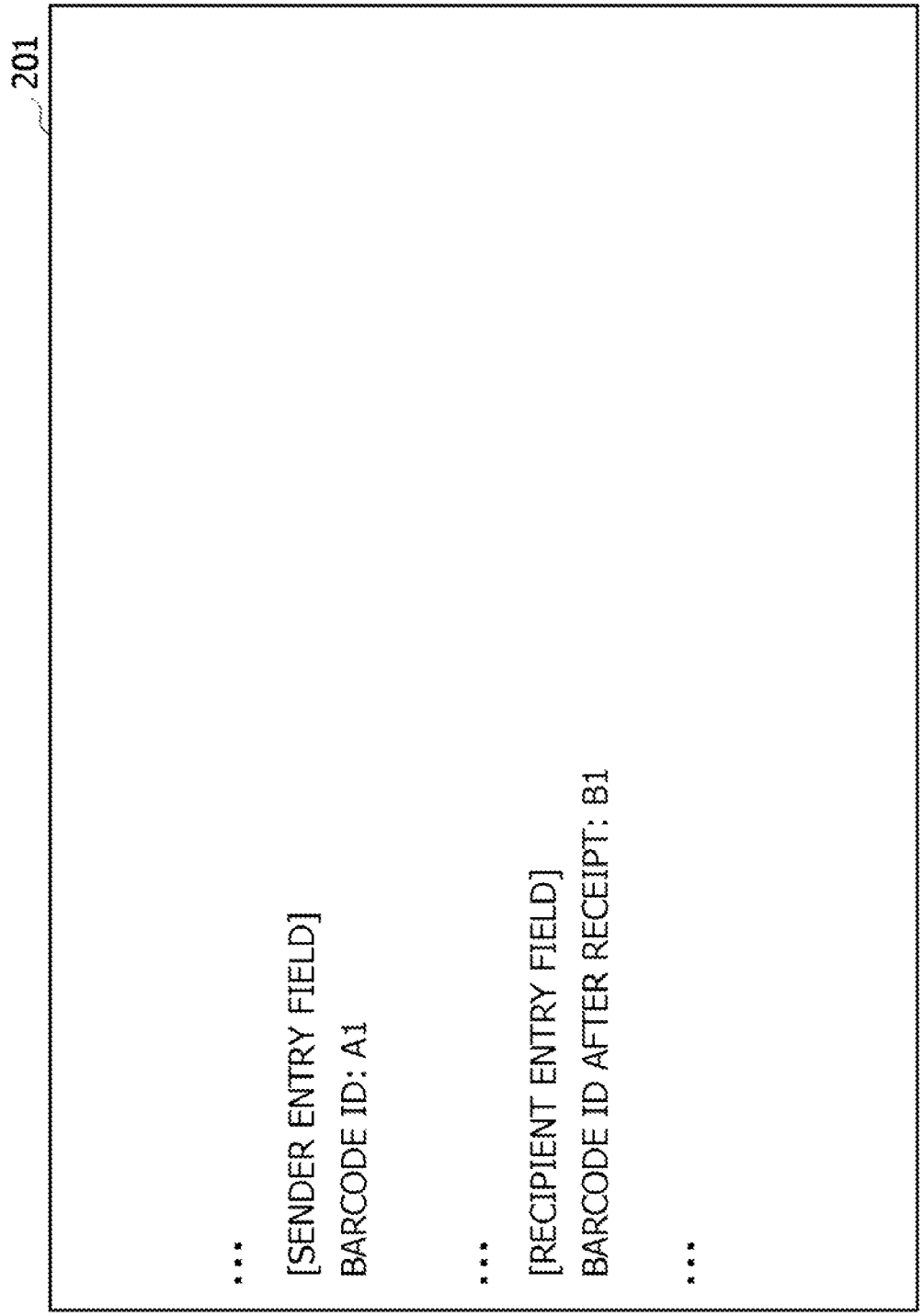

FIG. 22A

| BARCODE ID | ITEM ID | ITEM NAME | QUANTITY | STATUS |
|---|---|---|---|---|
| — | — | — | — | — |

| DATA ID | HISTORY ID |
|---|---|
| B1 | T1 |

| BARCODE ID | ITEM ID | ITEM NAME | QUANTITY | STATUS |
|---|---|---|---|---|
| B1 | X1 | PRODUCT X1 | 200 | ARRIVAL |
| B2 | X2 | PRODUCT X2 | 300 | PRODUCTION |

FIG. 24B 310-2B

| DATA ID | HISTORY ID |
|---|---|
| B1 | T2 |
| B2 | T3 |

FIG. 25

| HISTORY ID | PREVIOUS HISTORY ID | UPDATED VALUE | BARCODE ID |
|---|---|---|---|
| T1 | — | {"ITEM ID": "X1", "ITEM NAME": "PRODUCT X1", "QUANTITY": "200", "STATUS": "PRODUCTION"} | A1 |
| T2 | T1 | {"ITEM ID": "X1", "ITEM NAME": "PRODUCT X1", "QUANTITY": "200", "STATUS": "ARRIVAL"} | B1 |
| T3 | — | {"ITEM ID": "X2", "ITEM NAME": "PRODUCT X2", "QUANTITY": "300", "STATUS": "PRODUCTION"} | B2 |

```
[config]
DATA_ID = "BARCODE ID"
TABLE_NAME = "PRODUCTION MANAGEMENT TABLE"
VALUES_ID = {[HISTORY-ITEM NAME] = "ITEM NAME", [HISTORY-QUANTITY] = "QUANTITY", [HISTORY-STATUS] = "STATUS"}
RECORD_FORMAT = "[HISTORY-QUANTITY][HISTORY-ITEM NAME] HAVE BEEN SUBJECT TO [HISTORY-STATUS]."
```

```
2021-02-01T06:18:10.044313Z Query INSERT INTO PRODUCTION MANAGEMENT
TABLE (BARCODE ID, ITEM ID, ITEM NAME, QUANTITY, STATUS) VALUES ('A1',
'X1', 'PRODUCT X1', 200, 'PRODUCTION')

2021-02-01T06:18:10.045899Z Query INSERT INTO PRODUCTION MANAGEMENT
TABLE (BARCODE ID, ITEM ID, ITEM NAME, QUANTITY, STATUS) VALUES ('A2',
'X2', 'PRODUCT X2', 300, 'PRODUCTION')
```

FIG. 29A

| BARCODE ID | ITEM ID | ITEM NAME | QUANTITY | STATUS |
|---|---|---|---|---|
| A1 | X1 | PRODUCT X1 | 200 | PRODUCTION |
| A2 | X2 | PRODUCT X2 | 300 | PRODUCTION |

| DATA ID | HISTORY ID |
|---|---|
| A1 | T1 |
| A2 | T2 |

| HISTORY ID | PREVIOUS HISTORY ID | UPDATED VALUE |
|---|---|---|
| T1 | – | {"200 PRODUCTS X1 HAVE BEEN SUBJECT TO PRODUCTION."} |
| T2 | – | {"300 PRODUCTS X2 HAVE BEEN SUBJECT TO PRODUCTION."} |

```
[config]
DATA_ID = "BARCODE ID"
TABLE_NAME = "PRODUCTION MANAGEMENT TABLE"
TABLE_FORMAT = ("BARCODE ID", "ITEM ID", "ITEM NAME", "QUANTITY", "STATUS")
```

```
...
2021-02-01T06:18:10.044313Z Query INSERT INTO PRODUCTION MANAGEMENT TABLE VALUES ('A1', 'X1', 'PRODUCT X1', 200, 'PRODUCTION')
2021-02-01T06:18:10.045899Z Query INSERT INTO PRODUCTION MANAGEMENT TABLE VALUES ('A2', 'X2', 'PRODUCT X2', 300, 'PRODUCTION')
...
```

FIG. 32A 120A-3

| BARCODE ID | ITEM ID | ITEM NAME  | QUANTITY | STATUS     |
|------------|---------|------------|----------|------------|
| A1         | X1      | PRODUCT X1 | 200      | PRODUCTION |
| A2         | X2      | PRODUCT X2 | 300      | PRODUCTION |

FIG. 32B 310-1B

| DATA ID | HISTORY ID |
|---------|------------|
| A1      | T1         |
| A2      | T2         |

| HISTORY ID | PREVIOUS HISTORY ID | UPDATED VALUE |
|------------|---------------------|---------------|
| T1 | – | {"ITEM ID": "X1", "ITEM NAME": "PRODUCT X1", "QUANTITY": "200", "STATUS": "PRODUCTION"} |
| T2 | – | {"ITEM ID": "X2", "ITEM NAME": "PRODUCT X2", "QUANTITY": "300", "STATUS": "PRODUCTION"} |

NON-TRANSITORY COMPUTER-READABLE STORAGE MEDIUM, MANAGEMENT METHOD, AND MANAGEMENT DEVICE

CROSS-REFERENCE TO RELATED APPLICATION

This application is based upon and claims the benefit of priority of the prior Japanese Patent Application No. 2021-115729, filed on Jul. 13, 2021, the entire contents of which are incorporated herein by reference.

FIELD

The embodiments discussed herein are related to a management program, a management method, and a management device.

BACKGROUND

In recent years, there has been known a traceability system having a function of tracking origin of goods and data and a history of processes. Specifically, for example, there has been known a technique of dynamically linking data items to be collected in each of multiple processes to traceability information of a product stored in a database.

Japanese Laid-open Patent Publication No. 2008-59362 is disclosed as related art.

SUMMARY

According to an aspect of the embodiments, an apparatus includes A non-transitory computer-readable storage medium storing a management program that causes a processor included in a computer to execute a process, the process includes: extracting data identification information that identifies monitoring target data from instruction log data, the instruction log data being recorded operation for the monitoring target data to be monitored; and storing, in a memory, the data identification information and history identification information that identifies history data in association with each other, the history data indicating a history of the operation for the monitoring target data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6A is a first diagram illustrating an exemplary table in the first embodiment;

FIG. 6B is a first diagram illustrating an exemplary table in the first embodiment;

FIG. 6C is a first diagram illustrating an exemplary table in the first embodiment;

FIG. 8 is a first diagram illustrating exemplary instruction log data according to the first embodiment;

FIG. 9A is a second diagram illustrating an exemplary table in the first embodiment;

FIG. 9B is a second diagram illustrating an exemplary table in the first embodiment;

FIG. 9C is a second diagram illustrating an exemplary table in the first embodiment;

FIG. 10 is a first diagram for explaining history data stored in a history management table according to the first embodiment;

FIG. 11 is a second diagram illustrating exemplary instruction log data according to the first embodiment;

FIG. 12A is a third diagram illustrating an exemplary table in the first embodiment;

FIG. 12B is a third diagram illustrating an exemplary table in the first embodiment;

FIG. 12C is a third diagram illustrating an exemplary table in the first embodiment;

FIG. 18A is a first diagram illustrating an exemplary table in the second embodiment;

FIG. 18B is a first diagram illustrating an exemplary table in the second embodiment;

FIG. 21 is a diagram for explaining slip information according to the second embodiment;

FIG. 22A is a third diagram illustrating an exemplary table in the second embodiment;

FIG. 22B is a third diagram illustrating an exemplary table in the second embodiment;

FIG. 24A is a fourth diagram illustrating exemplary table in the second embodiment;

FIG. 24B is a fourth diagram illustrating an exemplary table in the second embodiment;

FIG. 25 is a fifth diagram illustrating an exemplary table in the second embodiment;

FIG. 27 is a diagram illustrating exemplary environmental data according to a third embodiment;

FIG. 28 is a diagram illustrating exemplary instruction log data according to the third embodiment;

FIG. 29A is a diagram illustrating an exemplary table in the third embodiment;

FIG. 29B is a diagram illustrating an exemplary table in the third embodiment;

FIG. 29C is a diagram illustrating an exemplary table in the third embodiment;

FIG. 30 is a diagram illustrating exemplary environmental data according to a fourth embodiment;

FIG. 31 is a diagram illustrating exemplary instruction log data according to the fourth embodiment;

FIG. 32A is a diagram illustrating an exemplary table in the fourth embodiment;

FIG. 32B is a diagram illustrating an exemplary table in the fourth embodiment; and FIG. 32C is a diagram illustrating an exemplary table in the fourth embodiment.

DESCRIPTION OF EMBODIMENTS

According to the conventional technique mentioned above, in a case of adding the function of the traceability system to another system or the like, it needs to add a program for registering, in the traceability system, a monitoring result of processing of the goods and data to the another system, which is great burden.

In one aspect, the embodiments aim to easily add a function of managing a history.

First Embodiment

Figure 1:
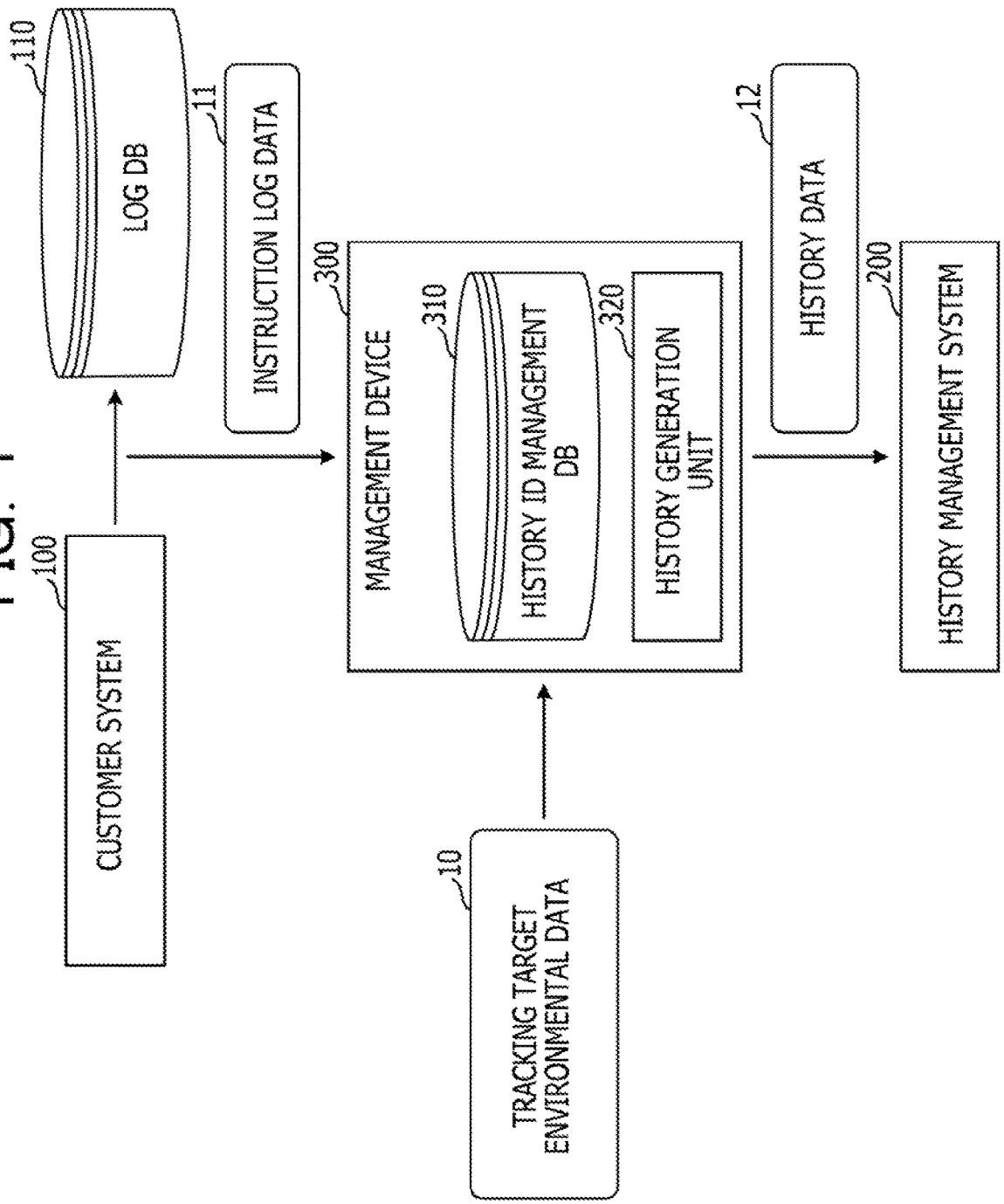
FIG. 1 is a diagram for explaining a management device according to a first embodiment.

Hereinafter, a first embodiment will be described with reference to the drawings. FIG. 1 is a diagram for explaining a management device according to the first embodiment.

A customer system 100 illustrated in FIG. 1 is an exemplary system to which a history management system 200 is introduced, and is managed by an organization or the like involved in distribution of goods and data. The customer system 100 is a system for managing goods, data, and the like to be distributed. In the following descriptions, the goods, data, and the like to be distributed may be referred to as tracking objects. The tracking objects may be, for example, packages and the like to be transported by a delivery service company.

Furthermore, in the following descriptions, data indicating a status of a tracking object may be referred to as management data. The management data is stored and managed in a management table or the like included in the customer system 100. In other words, for example, the management data is monitoring target data to be monitored by a management device 300.

Furthermore, the customer system 100 outputs various log data in the customer system 100 to a log database 110 and manages them. Note that the log database 110 may also be included in the customer system 100. Examples of the log data include access log data indicating access to the customer system 100, instruction log data indicating an instruction to the customer system 100, error log data indicating an error in the customer system 100, and the like.

The history management system 200 according to the present embodiment is a system for tracking a history or location of a tracking object. In other words, for example, the history management system 200 according to the present embodiment is a traceability system for tracing (tracking) a tracking object.

The management device 300 according to the present embodiment includes a history Identifier (ID) management database 310 and a history generation unit 320, and links the customer system 100 with the history management system 200. Note that the customer system 100 linked to the history management system 200 is set as one in the present embodiment.

Specifically, for example, environmental data 10 in which data items to be included in the history data are defined is set in the management device 300 in advance in the present embodiment.

Next, the management device 300 obtains, using the history generation unit 320, instruction log data 11 from the log data output from the customer system 100, and extracts, from the instruction log data 11, values of the data items defined by the environmental data 10.

Note that, here, the instruction log data to be obtained indicates the instruction log data recording operation performed on the management data (monitoring target data). Furthermore, the instruction log data 11 according to the present embodiment indicates, for example, command information such as structured query language (SQL) indicating operation on a table for the management data managed by the customer system 100. Furthermore, the values of the data items extracted here include data identification information (data ID) for identifying the management data to be tracked and a value updated in the management data (updated value).

In the following descriptions, a data item name and a value of the data item name extracted from the instruction log data 11 based on the environmental data 10 may be referred to as parameters. That is, for example, the parameters in the present embodiment include the data ID and the updated value.

Next, the management device 300 stores the data ID in the history ID management database 310 using the history generation unit 320.

Moreover, the management device 300 generates history data in which the extracted updated value and data ID are associated with each other, and outputs it to the history management system 200 to cause the history management system 200 to store it. The history data according to the present embodiment is data indicating a history of operations (updates) performed on the management data (monitoring target data).

Note that the history management system 200 includes a history management table or the like for managing the history data, and the history data is stored and managed in the history management table or the like. The history management system 200 assigns, to the history data, history identification information (history ID) for identifying the history data.

In the present embodiment, as described above, the management device 300 associates the management data managed by the customer system 100 with the history data stored in the history management system 200. Therefore, according to the present embodiment, it is possible to link the customer system 100 with the history management system 200 without any modification made thereto, and to easily add a function of managing a history to the customer system 100.

Figure 2:
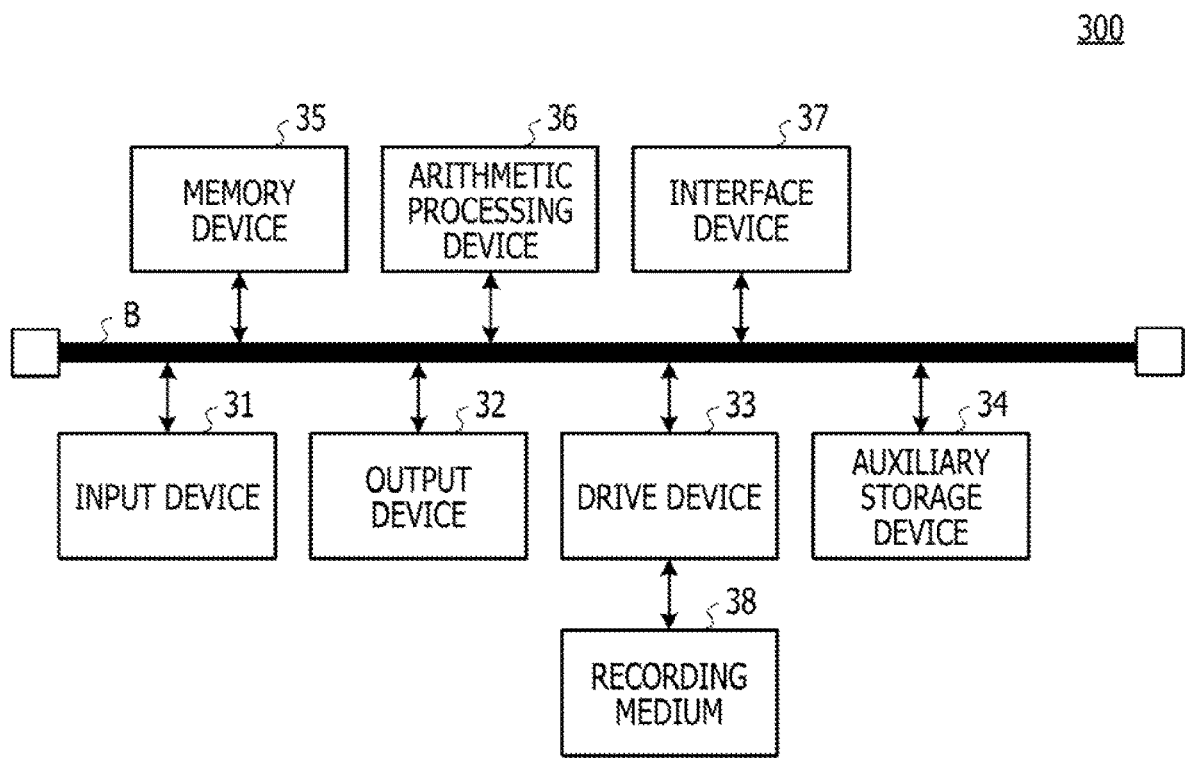
FIG. 2 is a diagram for explaining a hardware structure of the management device according to the first embodiment.

Hereinafter, the management device 300 according to the present embodiment will be described. FIG. 2 is a diagram for explaining a hardware structure of the management device according to the first embodiment.

The management device 300 according to the present embodiment is a computer including an input device 31, an output device 32, a drive device 33, an auxiliary storage device 34, a memory device 35, an arithmetic processing device 36, and an interface device 37 mutually connected via a bus B.

The input device 31 is a device for inputting various types of information, and is constructed by, for example, a keyboard, a pointing device, or the like. The output device 32 is for outputting various types of information, and is constructed by, for example, a display or the like. The interface device 37 includes a local area network (LAN) card and the like, and is used for connection to a network.

A management program that implements the history generation unit 320 included in the management device 300 is at least a part of various programs that control the management device 300. The management program is provided by, for example, distribution of a recording medium 38, download from a network, and the like. As the recording medium 38 that records the management program, it is possible to use various types of recording media such as a recording medium that optically, electrically, or magnetically records information such as a compact disc read only memory (CD-ROM), a flexible disk, or a magneto-optical disk, a semiconductor memory that electrically records information such as a read only memory (ROM) or a flash memory, and the like.

When the recording medium 38 that records the management program is set in the drive device 33, the management program recorded in the recording medium 38 is installed in the auxiliary storage device 34 from the recording medium 38 via the drive device 33. The management program downloaded from the network is installed in the auxiliary storage device 34 via the interface device 37.

The auxiliary storage device 34 that implements the history ID management database 310 stores the management program installed in the management device 300, and also stores various files, data, and the like needed for the management device 300. The memory device 35 reads the management program from the auxiliary storage device 34 at startup of the management device 300, and stores it. Then, the arithmetic processing device 36 executes various types of processing to be described later in accordance with the management program stored in the memory device 35.

Figure 3:
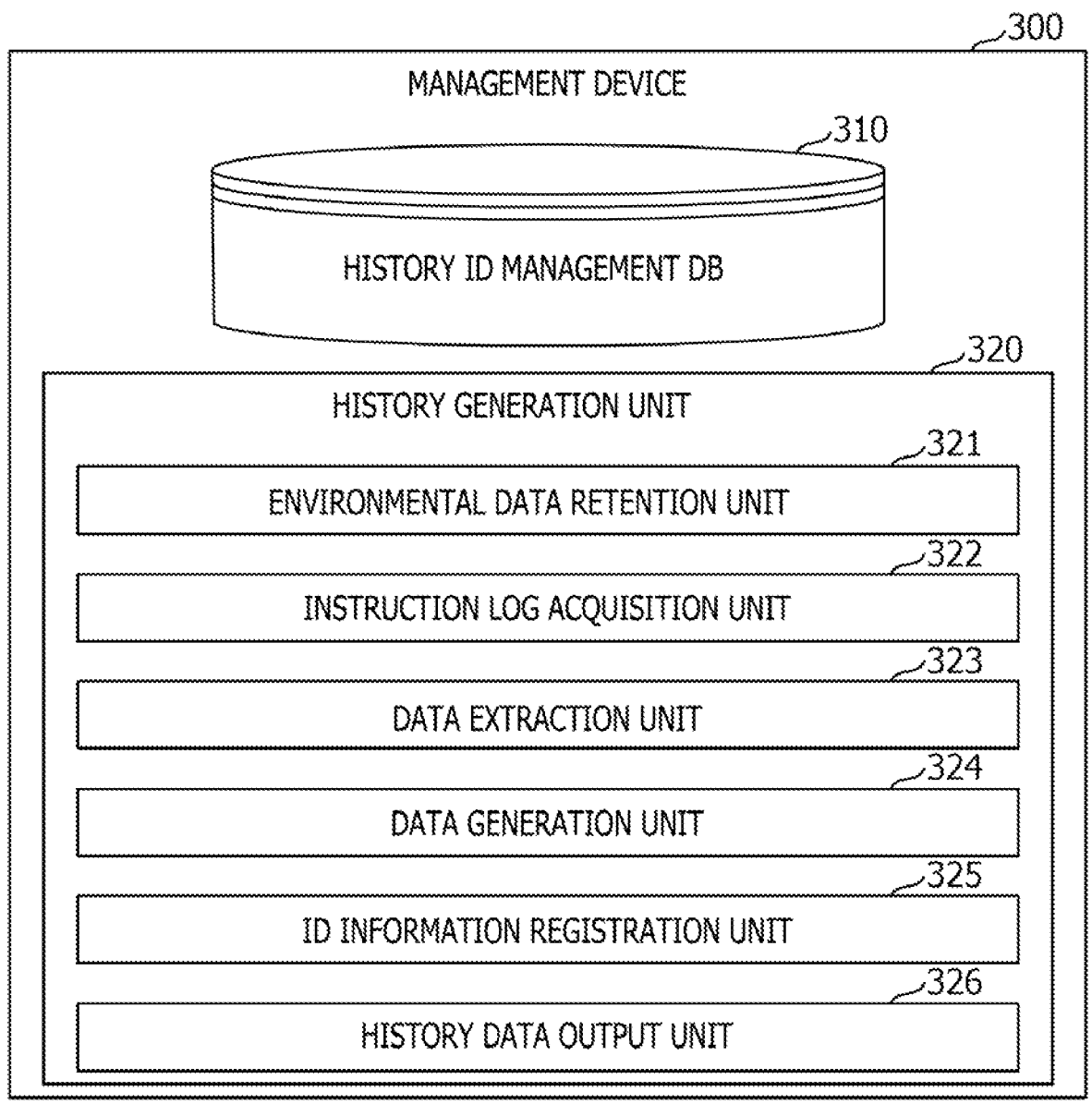
FIG. 3 is a diagram for explaining functions of the management device according to the first embodiment.

Next, functions of the management device 300 according to the present embodiment will be described with reference to FIG. 3. FIG. 3 is a diagram for explaining the functions of the management device according to the first embodiment.

The management device 300 according to the present embodiment includes the history ID management database 310 and the history generation unit 320.

The history ID management database 310 stores ID management data including the data ID and the history ID associated by the history generation unit 320.

The history generation unit 320 generates ID management data and history data. The ID management data is stored in the history ID management database 310. The history data is output to the history management system 200, and is stored in the history management table or the like included in the history management system 200.

The history generation unit 320 includes an environmental data retention unit 321, an instruction log acquisition unit 322, a data extraction unit 323, a data generation unit 324, an ID information registration unit 325, and a history data output unit 326.

The environmental data retention unit 321 retains the environmental data 10 input by an administrator of the customer system 100 or the like. The environmental data 10 is information that defines data items for which values are extracted from the instruction log data. In other words, for example, the environmental data 10 is information that defines data items to be included in the history data. Details of the environmental data 10 will be described later.

The instruction log acquisition unit 322 obtains instruction log data output from the customer system 100. The instruction log data to be obtained here includes instruction log data other than the instruction log data for the management data to be monitored.

The data extraction unit 323 extracts a parameter from the instruction log data on the basis of the environmental data 10 and the instruction log data obtained by the instruction log acquisition unit 322.

The data generation unit 324 generates ID management data and history data. Specifically, for example, the data generation unit 324 obtains the data ID of the management data, and associates it with the history ID for identifying the history data to generate the ID management data. Note that the history ID may be assigned by the history management system 200.

Furthermore, the data generation unit 324 generates the history data in which the history ID is associated with the updated value included in the parameter extracted from the instruction log data.

The ID information registration unit 325 stores the ID management data generated by the data generation unit 324 in the history ID management database 310.

The history data output unit 326 outputs the history data generated by the data generation unit 324 to the history management system 200.

Figure 4:
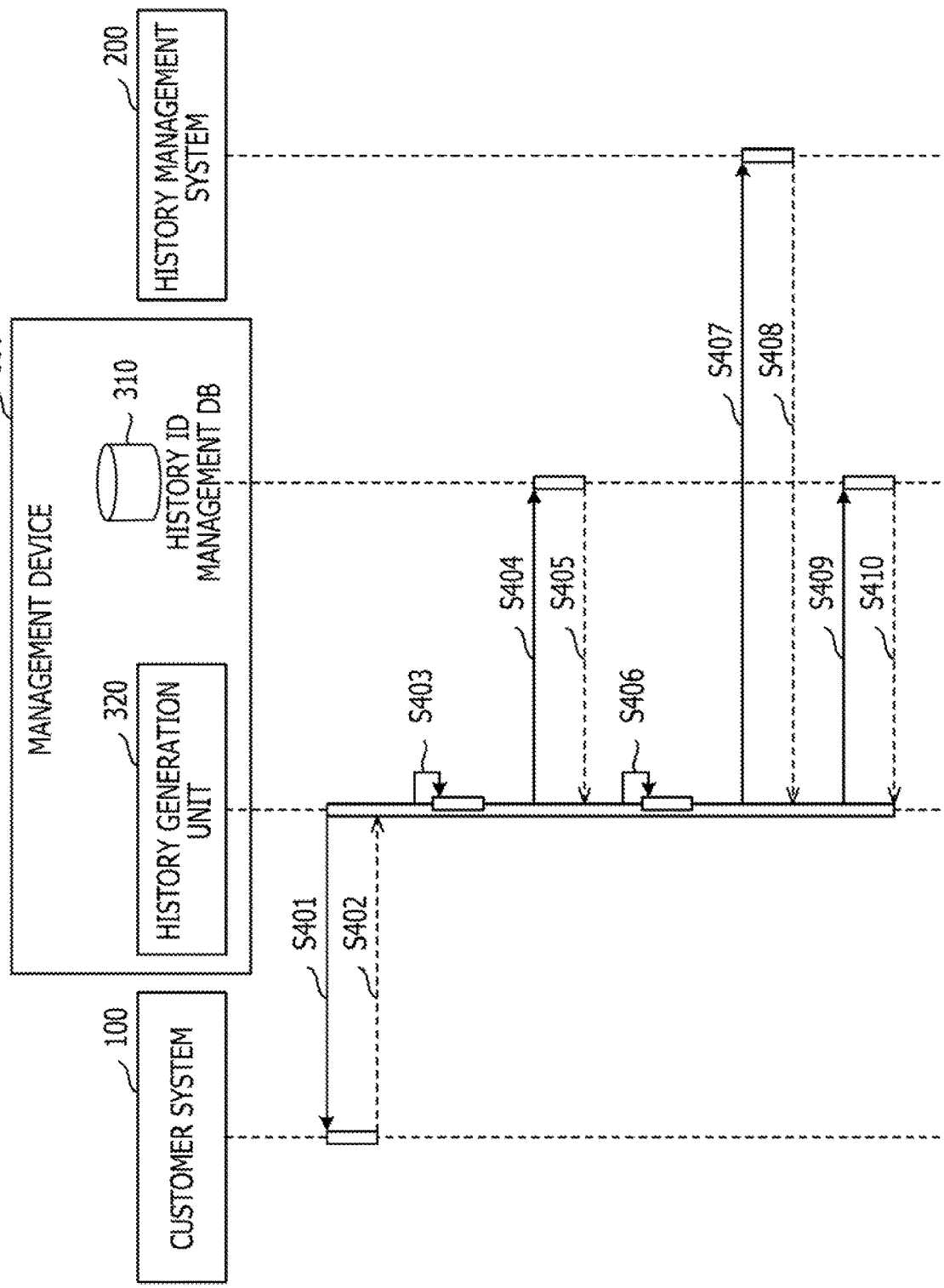
FIG. 4 is a sequence diagram for explaining operation of the management device according to the first embodiment.

Next, operation of the management device 300 according to the present embodiment will be described with reference to FIG. 4. FIG. 4 is a sequence diagram for explaining the operation of the management device according to the first embodiment.

In the management device 300 according to the present embodiment, the history generation unit 320 obtains the instruction log data from the customer system 100 using the instruction log acquisition unit 322 (steps S401 and 402).

Subsequently, the history generation unit 320 collates the environmental data 10 with the instruction log data using the data extraction unit 323, and extracts a parameter from the instruction log data obtained by the instruction log acquisition unit 322 (step S403). In other words, for example, the data extraction unit 323 performs pattern matching between the instruction log data and the environmental data 10, and extracts one record corresponding to the environmental data 10 from an instruction log data group obtained in step S402.

Subsequently, the history generation unit 320 searches the history ID management database 310 with the data ID included in the extracted parameter using the data generation unit 324 (step S404), and obtains a search result (step S405).

Subsequently, the data generation unit 324 generates history data according to the search result (step S406). Details of the process of steps S403 to S406 will be described later.

Subsequently, the history generation unit 320 outputs the generated history data to the history management system 200 using the history data output unit 326 (step S407), and receives the history ID as notification indicating that registration of the history data is complete from the history management system 200 (step S408).

Subsequently, the history generation unit 320 generates ID management data in which the history ID and the data ID are associated with each other using the data generation unit 324, and stores the ID management data in the history ID management database 310 using the ID information registration unit 325 (step S409).

The history generation unit 320 receives a response indicating that the registration of the ID management data is complete from the history ID management database 310 (step S410), and terminates the process.

Through this operation, the management device 300 according to the present embodiment associates the data ID of the management data managed by the customer system 100 with the history ID of the history data managed by the history management system 200.

Figure 5:
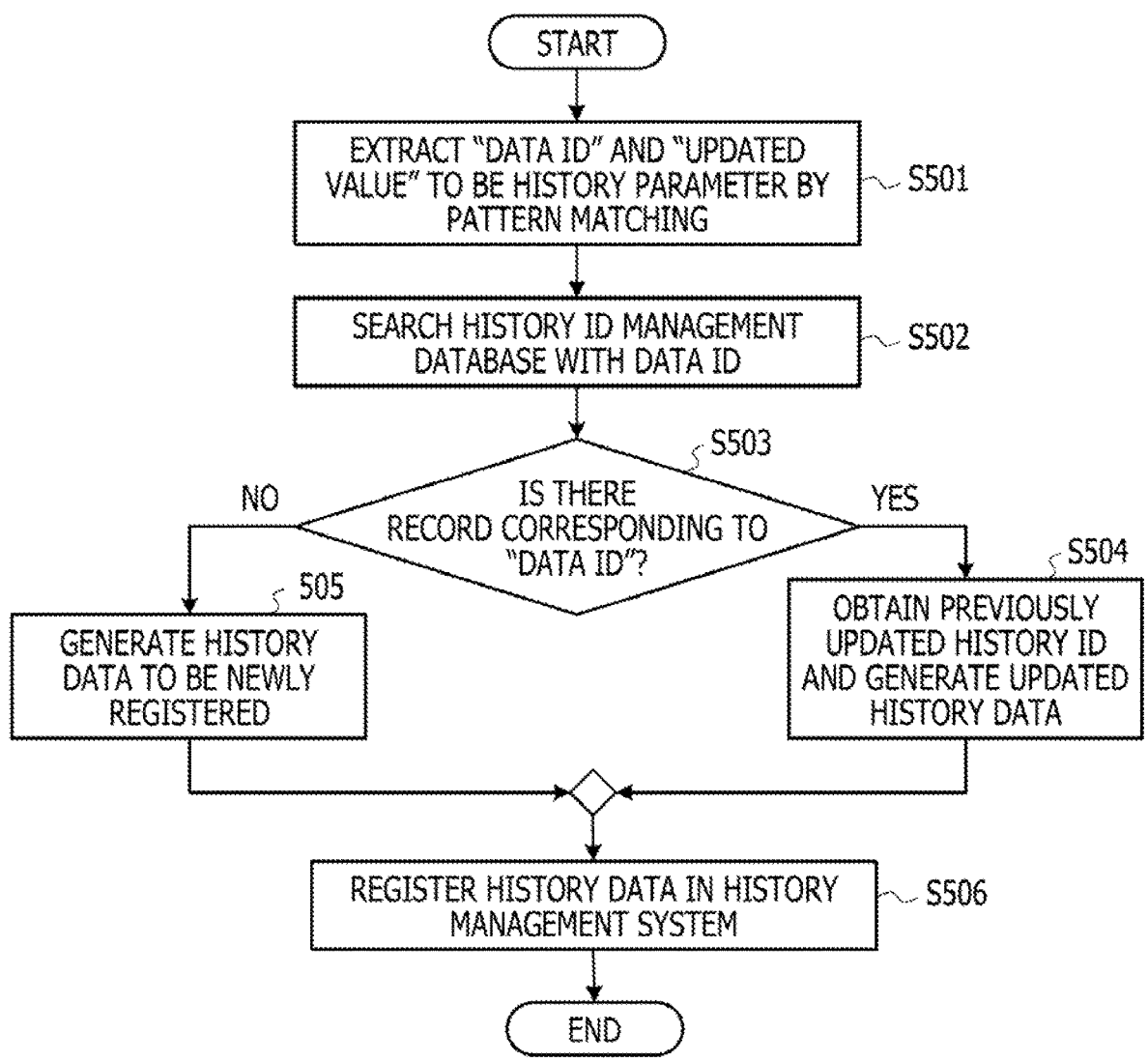
FIG. 5 is a flowchart for explaining a process of a history generation unit according to the first embodiment.

Next, a process of the history generation unit 320 according to the present embodiment will be further described with reference to FIG. 5. FIG. 5 is a flowchart for explaining the process of the history generation unit according to the first embodiment. FIG. 5 illustrates the details of the process of steps S403 to S406 in FIG. 4.

In the management device 300 according to the present embodiment, the history generation unit 320 performs the pattern matching between the instruction log data 11 and the environmental data 10 using the data extraction unit 323, and extracts a parameter to be a part of the history data (step S501).

Subsequently, the history generation unit 320 searches, using the data generation unit 324, the history ID management database 310 with the data ID included in the parameter serving as a key (step S502). Subsequently, the data generation unit 324 determines whether or not there is a record (ID management data) including the data ID in the history ID management database 310 as a result of the search (step S503).

When there is the relevant record in step S503, the data generation unit 324 obtains the history ID generated in the previous process from the history ID management database 310, generates history data in which the history ID of the previous process is set as previous history ID (step S504), and proceeds to step S506 to be described later.

When there is no relevant record in step S503, the data generation unit 324 generates history data to be newly registered (step S505), and proceeds to step S506 to be described later.

When the history data is generated, the history generation unit 320 outputs, using the history data output unit 326, the generated history data to the history management system 200, and causes it to be registered (stored) (step S506).

Hereinafter, a process of the history generation unit 320 will be specifically described. FIGS. 6A to 6C are first diagrams illustrating exemplary tables in the first embodiment.

FIG. 6A illustrates an example of a production management table 120 in which the management data for managing the tracking object is stored in the customer system 100. The production management table 120 is an example of various management tables included in the customer system 100.

The production management table 120 includes, for example, barcode ID, item ID, an item name, a quantity, and a status as information items. A value of the item "barcode ID" is identification information for identifying the tracking object, and corresponds to the data ID in the present embodiment. A value of the item "item ID" is identification information for identifying the item of the tracking object, and a value of the item "item name" represents the item name of the tracking object. A value of the item "quantity" represents the quantity of the tracking object, and a value of the item "status" represents the status of the tracking object.

The history ID management database 310 includes data ID and history ID as information items. A value of the item "data ID" is identification information for identifying the management data of the tracking object, and is extracted from the management data. A value of the item "history ID" is identification information for identifying the history data, and is assigned to the history data generated by the history generation unit 320.

The history management table 210 includes history ID, previous history ID, and corresponding management data as information items. A value of the item "previous history ID" represents the history ID generated before generation of the history ID. A value of the item "corresponding management data" represents the updated value to be associated with the history ID.

The example of FIGS. 6A to 6C illustrates a state in which no management data is input in the customer system 100, and no management data of the tracking object is stored in the production management table 120 and no data is stored in each of the history ID management database 310 and the history management table 210.

Figure 7:
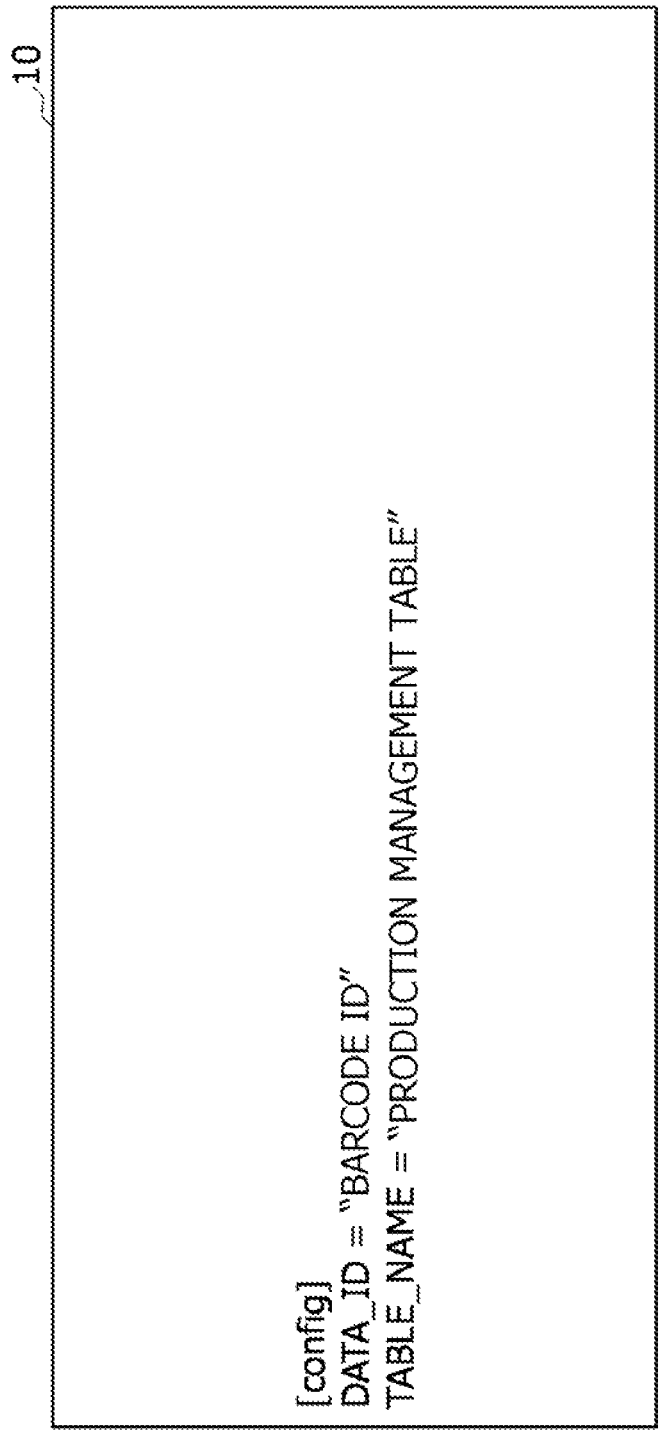
FIG. 7 is a diagram illustrating exemplary environmental data according to the first embodiment.

FIG. 7 is a diagram illustrating exemplary environmental data according to the first embodiment. In the example of FIG. 7, a column name and a table name are set as the environmental data 10.

The column name represents a data item name to be tracked. The table name represents a name of a table that manages a status of the tracking object in the database of the customer system 100.

In the example of FIG. 7, the column name is the "barcode ID", and the table name is the "production management table".

In the present embodiment, the environmental data 10 is set by the administrator of the customer system 100 or the like. In the present embodiment, with the environmental data 10 set by the administrator of the customer system 100, the administrator of the customer system 100 is enabled to add a limitation to the table to be monitored by the management device 300, and it becomes possible to suppress monitoring of data not related to the tracking.

FIG. 8 is a first diagram illustrating exemplary instruction log data according to the first embodiment. The instruction log data 11 illustrated in FIG. 8 is a log recording data operations on the database and data store performed in the customer system 100.

Note that the instruction log data 11 illustrated in FIG. 8 is exemplary instruction log data when the first data operation is performed on the production management table 120.

FIG. 8 illustrates a case where the database included in the customer system 100 is a relational database, and the instruction log data 11 is obtained in a form of a query log. Furthermore, instruction log data 11-1 and 11-2 illustrated in FIG. 8 indicate that data operation for the "production management table 120" has been performed in the customer system 100.

FIGS. 9A to 9C are second diagrams illustrating exemplary tables in the first embodiment. A management table 120-1 of FIG. 9A stores two pieces of management data. A history ID management database 310-1 of FIG. 9B stores ID management data corresponding to the two pieces of management data. A history management table 210-1 of FIG. 9C stores history data corresponding to the two pieces of management data.

When the history generation unit 320 according to the present embodiment obtains the instruction log data 11 illustrated in FIG. 8 using the instruction log acquisition unit 322, it performs pattern matching between the environmental data 10 and the instruction log data 11 using the data extraction unit 323.

The data extraction unit 323 according to the present embodiment sets the following matching conditions based on the environmental data 10, for example.

[Data update instruction statement][Table name]([Column name], . . . )[Connection statement]([Data ID], [Updated value])

Here, the parameters extracted from the instruction log data 11 are two items of the "data ID" and the "updated value" in the instruction log data 11-1 and 11-2 of the data operations on the production management table 120-1.

The "data ID" represents a value of the data item specified by the column name. The "updated value" represents a value of a data item other than the column name, which is a character string of the values set for the data ID. Furthermore, the "updated value" represents an updated value in the management data in the production management table 120.

In the example of FIGS. 9A to 9C, the value "A1" of the barcode ID in the production management table 120-1 is extracted as the data ID, and the data items "item ID", "item name", "quantity", and "status" and the values "X1", "product X1", "200", and "production" of the respective data items are extracted as the updated values.

Next, the data generation unit 324 searches the history ID management database 310 in the state illustrated in FIG. 6B with "A1" obtained as the data ID. Here, since the data ID "A1" is not present in the history ID management database 310, a result of no relevant ID is returned, and it is determined to be a history of new registration without the previous history ID.

Then, the data generation unit 324 generates history data associated with the parameters extracted as the updated values by the data extraction unit 323. Specifically, for example, the data generation unit 324 generates history data 211 in which the history ID "T1", the data items "item ID", "item name", "quantity", and "status", and the values "X1", "product X1", "200", and "production" of the respective data items are associated with each other.

The history data output unit 326 registers the history data 211 in the history management system 200. The history management system 200 generates new history ID "T1", and stores it in the history management table 210-1 in association with the history data 211.

The data generation unit 324 receives the history ID "T1" as notification indicating that the registration of the history data is complete from the history management system 200, and stores the ID management data in which the data ID "A1" and the history ID "T1" are associated with each other in the history ID management database 310-1.

Similarly, the history generation unit 320 associates history ID "T2" with history data 212 in which the parameters are extracted from the instruction log data 11-2 with each other, and stores it in the history management table 210-1 of the history management system 200. Furthermore, the history generation unit 320 stores ID management data in which data ID "A2" and the history ID "T2" are associated with each other in the history ID management database 310-1.

FIG. 10 is a first diagram for explaining the history data stored in the history management table according to the first embodiment.

The history data 211 is history data of the tracking object identified by the data ID "A1", and the history data 212 is history data of the tracking object identified by the data ID "A2".

Each of the history data 211 and 212 indicates that the management data including the data ID "A1" and the management data including the data ID "A2" are registered in the production management table 120. Therefore, the history data 211 and 212 are not associated with the history data indicating the history of the previous data operations.

Next, the management data including the data ID "A1" and the management data including the data ID "A2" in the production management table 120 and a case where each of the statuses thereof is updated from "production" to "shipment" will be described.

FIG. 11 is a second diagram illustrating exemplary instruction log data according to the first embodiment. Note that instruction log data 11A illustrated in FIG. 11 is exemplary instruction log data when the second data operation is performed on the production management table 120.

Instruction log data 11-3 illustrated in FIG. 11 indicates that new management data is stored, and in instruction log data 11-1a, the value of the item "status" is updated from "production" to "shipment".

The history generation unit 320 extracts, using the data extraction unit 323, parameters from the instruction log data 11-3 and 11-1a included in the instruction log data 11A.

FIGS. 12A to 12C are third diagrams illustrating exemplary tables in the first embodiment. A management table 120-2 of FIG. 12A stores new management data. Specifically, for example, in the production management table 120-2, the value of the item "status" of the management data including the barcode ID "A1" is updated from "production" to "shipment", and the new management data including barcode ID "A3" is stored.

A history ID management database 310-2 of FIG. 12B stores ID management data corresponding to the new management data.

A history management table 210-2 of FIG. 12C stores history data corresponding to the update of the production management table 120.

When the barcode ID "A3" is extracted from the instruction log data 11-3, the history generation unit 320 searches the history ID management database 310-1 with the barcode ID "A3". Here, there is no ID management data including the barcode ID "A3" (see FIGS. 9A to 9C).

Therefore, the history generation unit 320 stores history data 213 in which history ID "T3" and the parameter is associated with each other in the history management table 210-1 of the history management system 200.

Furthermore, the history generation unit 320 extracts parameters from the instruction log data 11-3, and stores ID management data in which the data ID "A3" and the history ID "T3" are associated with each other in the history ID management database 310-1.

Furthermore, when the barcode ID "A1" is extracted from the instruction log data 11-1a, the history generation unit 320 searches the history ID management database 310-1 with the barcode ID "A1". Here, there is ID management data including the barcode ID "A1".

Therefore, the history generation unit 320 obtains the history ID "T1" associated with the barcode ID "A1" in the history ID management database 310-1 as the "previous history ID". Then, the history generation unit 320 generates history data 214 in which the parameter extracted from the instruction log data 11-1a, the "previous history ID", and new history ID "T4" are associated with each other, and stores it in the history management table 210-1.

Moreover, the history generation unit 320 updates the history ID "T1" to "T4" in the ID management data including the barcode ID "A1" stored in the history ID management database 310-1.

The history ID management database 310-2 and the history management table 210-2 indicate a state after those processes are performed.

Figure 13:
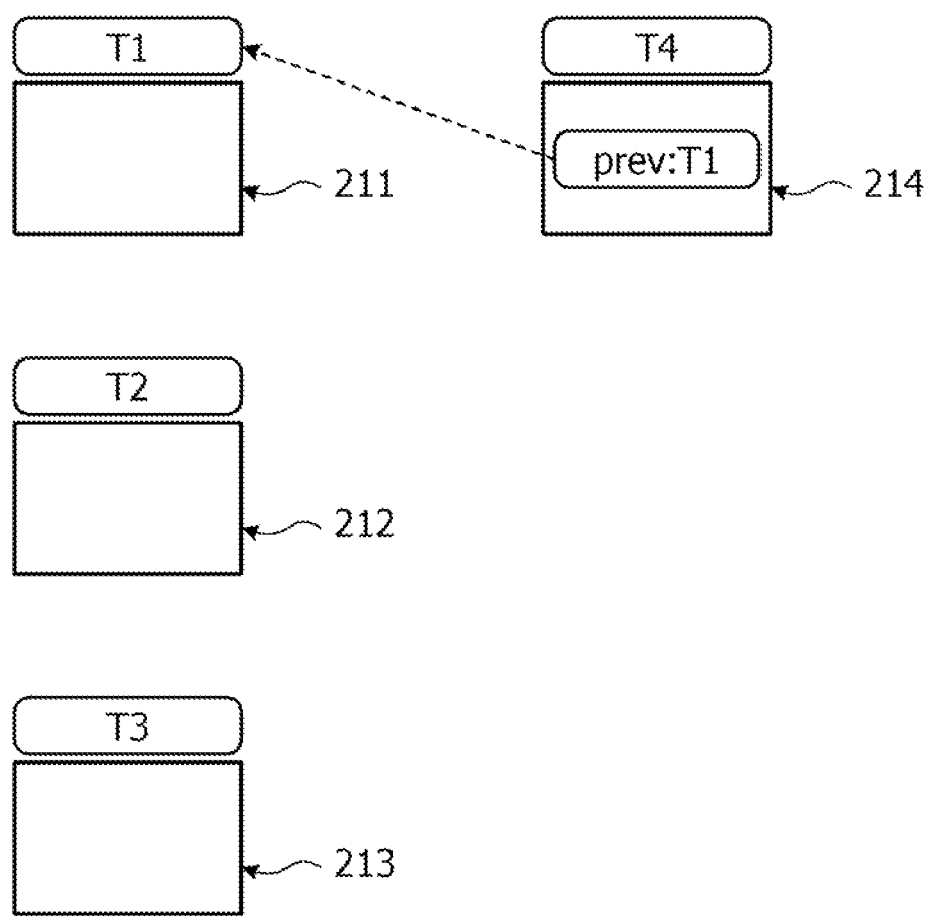
FIG. 13 is a second diagram for explaining the history data stored in the history management table according to the first embodiment.

FIG. 13 is a second diagram for explaining the history data stored in the history management table according to the first embodiment.

The history data 214 is history data of the tracking object identified by the data ID "A1". The history data 214 includes, as the previous history ID, the history ID "T1" of the history data 211 generated immediately before the generation of the history data 214.

That is, for example, the history data 214 is associated with the history data of the operations previously performed on the management data including the data ID "A1". Therefore, in the example of FIG. 13, it is possible to track the history data of the history ID "T1", which is in the past, from the latest history data corresponding to the data ID "A1".

Furthermore, the history data 213 indicates that the management data including the data ID "A3" is registered in the production management table 120-2. Therefore, the history data 213 is not associated with the history data indicating the history of the previous data operations.

In this manner, in the present embodiment, the data ID for identifying the tracking object and the parameter indicating the content of the data operation for the management data including the data ID are extracted from the instruction log data output from the customer system 100. Furthermore, in the present embodiment, the history ID associated with the parameter is generated, and is associated with the data ID.

Then, in the present embodiment, the history data in which the parameter and the history ID are associated with each other is generated, and is output to the history management system 200.

Moreover, in the present embodiment, the history management table 210 is searched at the time of generating the history data to determine whether or not the history data corresponding to the same data ID has been generated in the past. Then, in the present embodiment, when the history data corresponding to the same data ID has been generated in the past, the history ID of the previously generated history data is included in the history data to be generated as the previous history ID.

Accordingly, in the present embodiment, it is possible to trace (track) the past history data from the latest history data of the tracking object.

Therefore, according to the present embodiment, it becomes possible to associate the management data managed by the customer system 100 with the history data managed by the history management system 200 without making any modification to the customer system 100. In other words, for example, according to the present embodiment, it becomes possible to manage the history of the tracking object without changing the existing customer system 100.

Second Embodiment

Hereinafter, a second embodiment will be described with reference to the drawings. The second embodiment is different from the first embodiment in that the history management system 200 and a plurality of the customer systems 100 are linked. In the descriptions of the second embodiment below, differences from the first embodiment will be described, and components having functional structures similar to those in the first embodiment will be denoted by reference signs similar to the reference signs used in the descriptions of the first embodiment, and descriptions thereof will be omitted.

Figure 14:
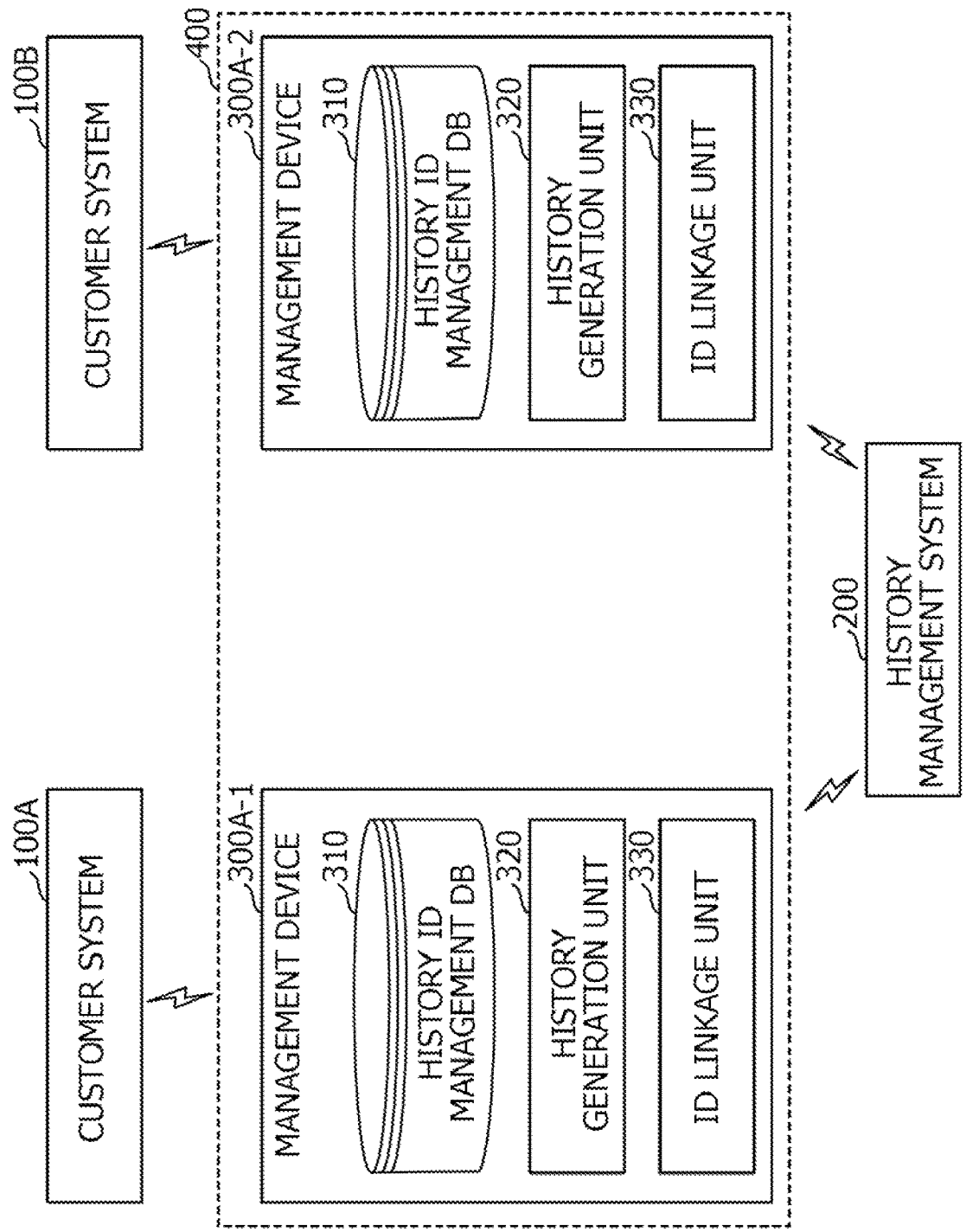
FIG. 14 is a diagram illustrating an exemplary system structure of a management system according to a second embodiment.

FIG. 14 is a diagram illustrating an exemplary system structure of a management system according to the second embodiment. A management system 400 according to the present embodiment includes management devices 300A-1 and 300A-2. Furthermore, the management system 400 according to the present embodiment links a customer system 100A and a customer system 100B with a history management system 200.

In the present embodiment, descriptions will be given on the assumption of a case where, for example, a tracking object (package) is stored in an organization in which the customer system 100A is introduced (e.g., package collecting station), and then transferred to an organization in which the customer system 100B is introduced (e.g., package delivery station) to be managed by the customer system 100B or the like.

In the management system 400, the management device 300A-1 links the customer system 100A with the history management system 200, and the management device 300A-2 links the customer system 100B with the history management system 200. In the following descriptions, the management devices 300A-1 and 300A-2 will be simply referred to as a management device 300A when they are not distinguished from each other.

The management device 300A according to the present embodiment includes a history ID management database 310, a history generation unit 320, and an ID linkage unit 330.

The ID linkage unit 330 according to the present embodiment associates data ID of management data obtained by another management device 300A with data ID of management data obtained by its own device.

Specifically, for example, the ID linkage unit 330 of the management device 300A-2 associates the data ID extracted from the instruction log data obtained from the customer system 100A in the management device 300A-1 with the data ID extracted from, by its own device, the instruction log data obtained from the customer system 100B.

Figure 15:
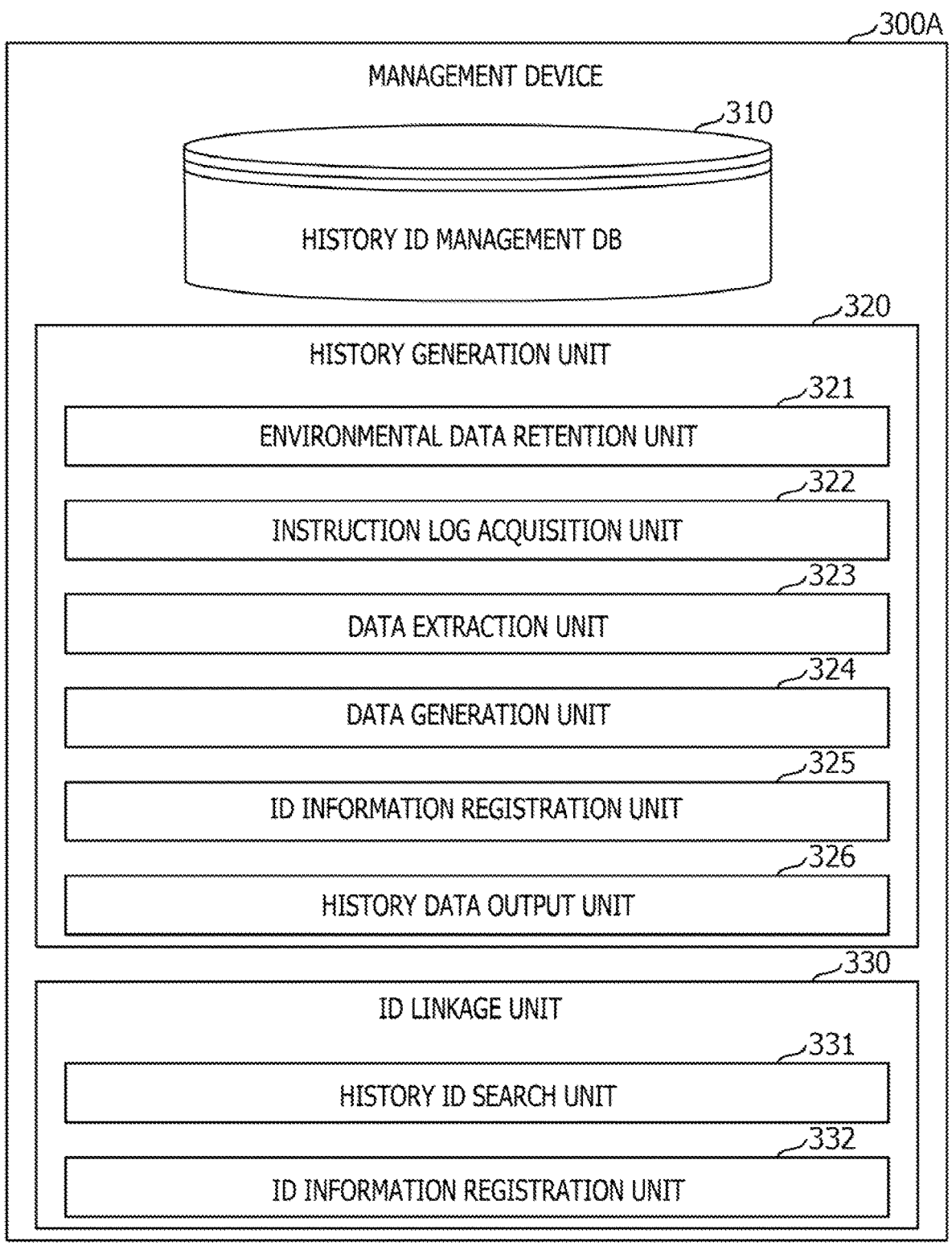
FIG. 15 is a diagram for explaining a functional structure of a management device according to the second embodiment.

FIG. 15 is a diagram for explaining a functional structure of the management device according to the second embodiment. The management device 300A according to the present embodiment includes a history ID management database 310, a history generation unit 320, and an ID linkage unit 330.

The ID linkage unit 330 according to the present embodiment includes a history ID search unit 331 and an ID information registration unit 332.

The history ID search unit 331 searches the history management table 210 of the history management system 200 with the data ID obtained by the another management device 300A.

The ID information registration unit 332 stores the history ID obtained as a search result of the history ID search unit 331 and the data ID obtained by its own device in the history ID management database 310 in association with each other.

Figure 16:
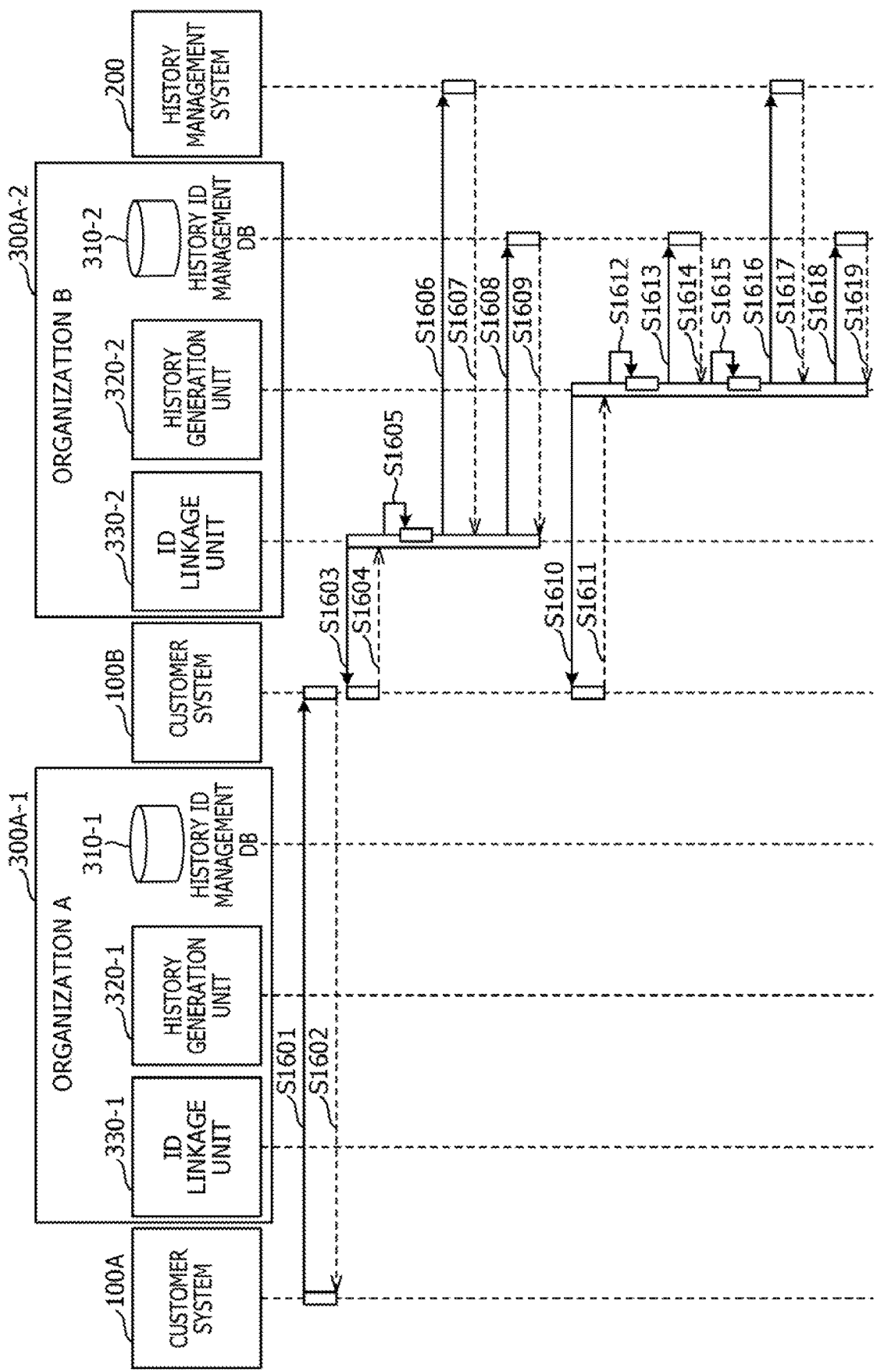
FIG. 16 is a sequence diagram for explaining operation of the management system according to the second embodiment.

Next, operation of the management system 400 according to the present embodiment will be described with reference to FIG. 16. FIG. 16 is a sequence diagram for explaining the operation of the management system according to the second embodiment.

Note that FIG. 16 illustrates operation after management data for tracking the tracking object is stored in the management device 300A-1 by a process similar to the process illustrated in FIGS. 6A to 6C according to the first embodiment.

Therefore, at a time point before the process of FIG. 16 is executed, ID management data in which the data ID for identifying the management data to be tracked is associated with the history ID is stored in the history ID management database 310-1. Furthermore, history data including the history ID associated with the data ID for identifying the management data to be tracked is stored in the history management table 210 of the history management system 200.

Furthermore, descriptions of FIG. 16 will be given on the assumption that the tracking object is a package, the organization in which the customer system 100A is introduced is a collecting station, and the organization in which the customer system 100B is introduced is a delivery station. Furthermore, in FIG. 16, barcode ID read from a barcode provided on a slip attached to the package is used as the data ID for identifying the management data to be tracked.

In the present embodiment, when the package is moved from the collecting station to the delivery station (step S1601 and step S1602), the barcode ID is transferred from the customer system 100A to the customer system 100B.

Specifically, for example, when the barcode printed on the slip attached to the package is read at the delivery station in which the customer system 100B is introduced, the customer system 100B is notified of the barcode ID.

At this time, the customer system 100B may also obtain, from the customer system 100A, slip information including the barcode ID and the data ID assigned by the customer system 100A. The slip information may be information indicating that the barcode ID in the customer system 100A and the barcode ID in the customer system 100B have the same value. Details of the slip information will be described later.

Here, a system of the data ID differs between the customer system 100A and the customer system 100B. Accordingly, the management device 300A-2 according to the present embodiment replaces the data ID associated with the barcode ID in the customer system 100A with the data ID used in the customer system 100B using an ID linkage unit 330-2.

Specifically, for example, the ID linkage unit 330-2 of the management device 300A-2 obtains the slip information from the customer system 100B (steps S1603 and 1604). Subsequently, the ID linkage unit 330-2 obtains the barcode ID included in the slip information using the history ID search unit 331 (step S1605).

In the present embodiment, the barcode ID is the data ID in the customer system 100A. Therefore, the ID linkage unit 330-2 searches, using the history ID search unit 331, the history management table 210 of the history management system 200 with the data ID (barcode ID) (step S1606).

At this time, the history data corresponding to the data ID is stored in the history management table 210 by the management device 300A. Therefore, the history ID search unit 331 obtains the history ID associated with the data ID as a search result (step S1607).

Subsequently, the ID linkage unit 330-2 stores, in the history ID management database 310-2, the ID management data in which the obtained history ID and the data ID assigned in the customer system 100B are associated with each other using the ID information registration unit 332 (step S1608), and completes the registration (step S1609).

Subsequently, the management device 300A-2 generates history data using a history generation unit 320-2. Since the process of steps S1610 to S1619 in FIG. 16 is similar to the process of steps S401 to S410 in FIG. 4, descriptions thereof will be omitted.

Figure 17:
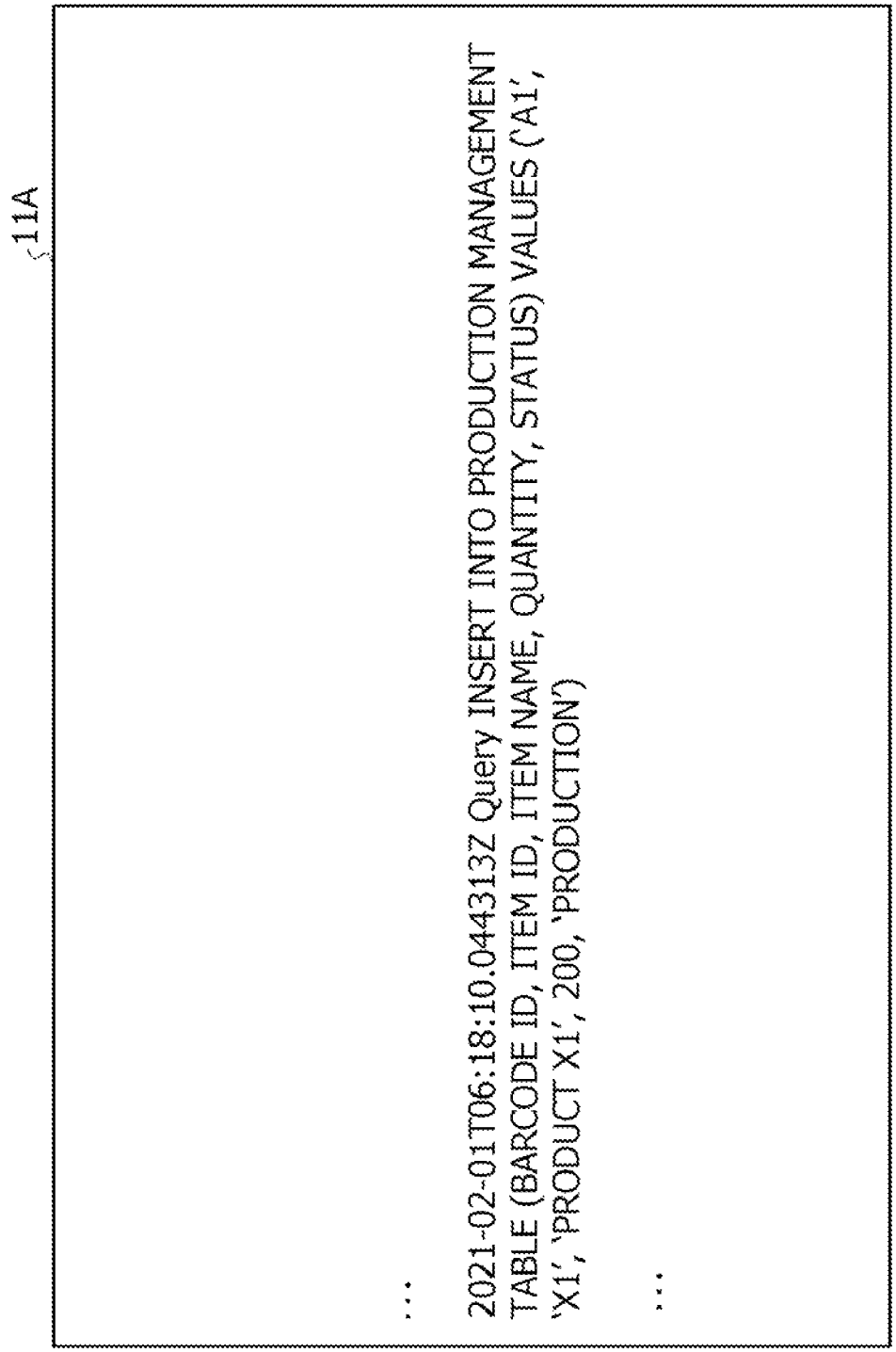
FIG. 17 is a first diagram illustrating exemplary instruction log data according to the second embodiment.

Hereinafter, the operation of the management system 400 according to the present embodiment will be further described. FIG. 17 is a first diagram illustrating exemplary instruction log data according to the second embodiment.

Instruction log data 11A illustrated in FIG. 17 is exemplary instruction log data output from the customer system 100A when the management data for tracking the tracking object is stored in a production management table 120A of the customer system 100A.

The management device 300A-1 according to the present embodiment obtains the instruction log data 11A using an instruction log acquisition unit 322 of a history generation unit 320-1, and extracts data ID and a parameter using a data extraction unit 323.

Figure 19:
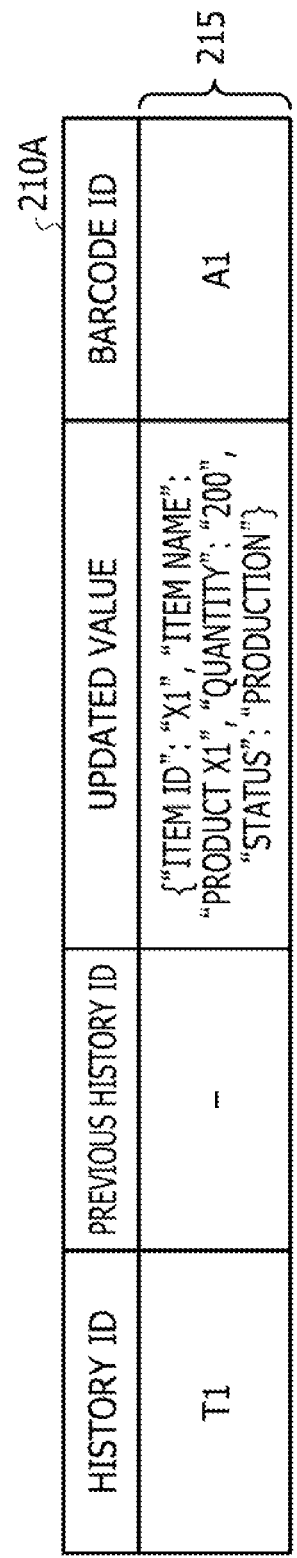
FIG. 19 is a second diagram illustrating an exemplary table in the second embodiment.

FIGS. 18A and 18B are first diagrams illustrating exemplary tables in the second embodiment, and FIG. 19 is a second diagram illustrating an exemplary table in the second embodiment.

A production management table 120A-1 illustrated in FIG. 18A, a history ID management database 310-1A illustrated in FIG. 18B, and a history management table 210A illustrated in FIG. 19 indicate a status of each table before the process illustrated in FIG. 16 starts. In other words, for example, each table illustrated in FIGS. 18A to 19 indicates a status of each table before the barcode ID is transferred to the customer system 100B.

The production management table 120A-1 illustrated in FIG. 18A stores management data for tracking the tracking object. The barcode ID included in the management data is "A1", and the status is "production". When the management data is stored in the production management table 120A, the customer system 100A outputs the instruction log data 11A illustrated in FIG. 17.

The history generation unit 320 of the management device 300A-1 obtains the instruction log data 11A output from the customer system 100A. Then, the history generation unit 320 extracts, from the instruction log data 11A, the barcode ID "A1" as data ID, and stores the ID management data associated with the history ID "Th" in the history ID management database 310-1.

The history ID management database 310-1A illustrated in FIG. 18B stores the ID management data associated with the history ID "Th" with the barcode ID "A1" as the data ID.

Furthermore, the management device 300A-1 stores, in the history management table 210, history data 215 in which the parameter extracted from the instruction log data 11A is associated with the history ID "T1".

The history management table 210A illustrated in FIG. 19 stores the history data 215. Note that the history data 215 according to the present embodiment includes barcode ID.

Figure 20:
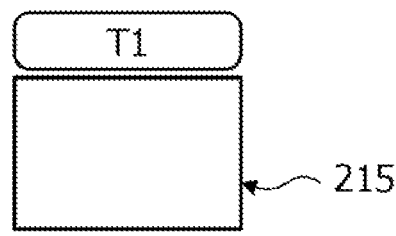
FIG. 20 is a first diagram for explaining history data stored in a history management table according to the second embodiment.

FIG. 20 is a first diagram for explaining the history data stored in the history management table according to the second embodiment.

The history data 215 generated by the management device 300A-1 is history data indicating that the management data identified by the data ID "A1" is newly stored in the production management table 120A, and thus does not include previous history ID.

Here, the slip information will be described with reference to FIG. 21. FIG. 21 is a diagram for explaining the slip information according to the second embodiment.

Slip information 201 illustrated in FIG. 21 indicates association between the data ID in the customer system 100A and the data ID in the customer system 100B.

Specifically, for example, in the present embodiment, the barcode ID is set as data ID "A1" in the customer system 100A, and the barcode ID after receipt is set as data ID "B1" in the customer system 100B.

Here, the barcode ID is an invariant value indicated by the barcode printed on the slip attached to the package. Therefore, the slip information 201 indicates that the data ID "A1" in the customer system 100A and the data ID "B1" in the customer system 100B are the same barcode ID.

FIGS. 22A and 22B are third diagrams illustrating exemplary tables in the second embodiment. FIGS. 22A and 22B illustrate states of a production management table 120B and the history ID management database 310-2 after the replacement of the data ID is carried out by the ID linkage unit 330-2. In other words, for example, FIGS. 22A and 22B illustrate the states of the production management table 120B and the history ID management database 310-2 when the process of steps S1601 to S1609 in FIG. 16 is complete.

A production management table 120B-1 illustrated in FIG. 22A is empty as the management data is not yet stored in the customer system 100B.

A history ID management database 310-2A illustrated in FIG. 22B stores the ID management data in which the data ID associated with the history ID "T1" is replaced with "B1" in the customer system 100B.

Figure 23:
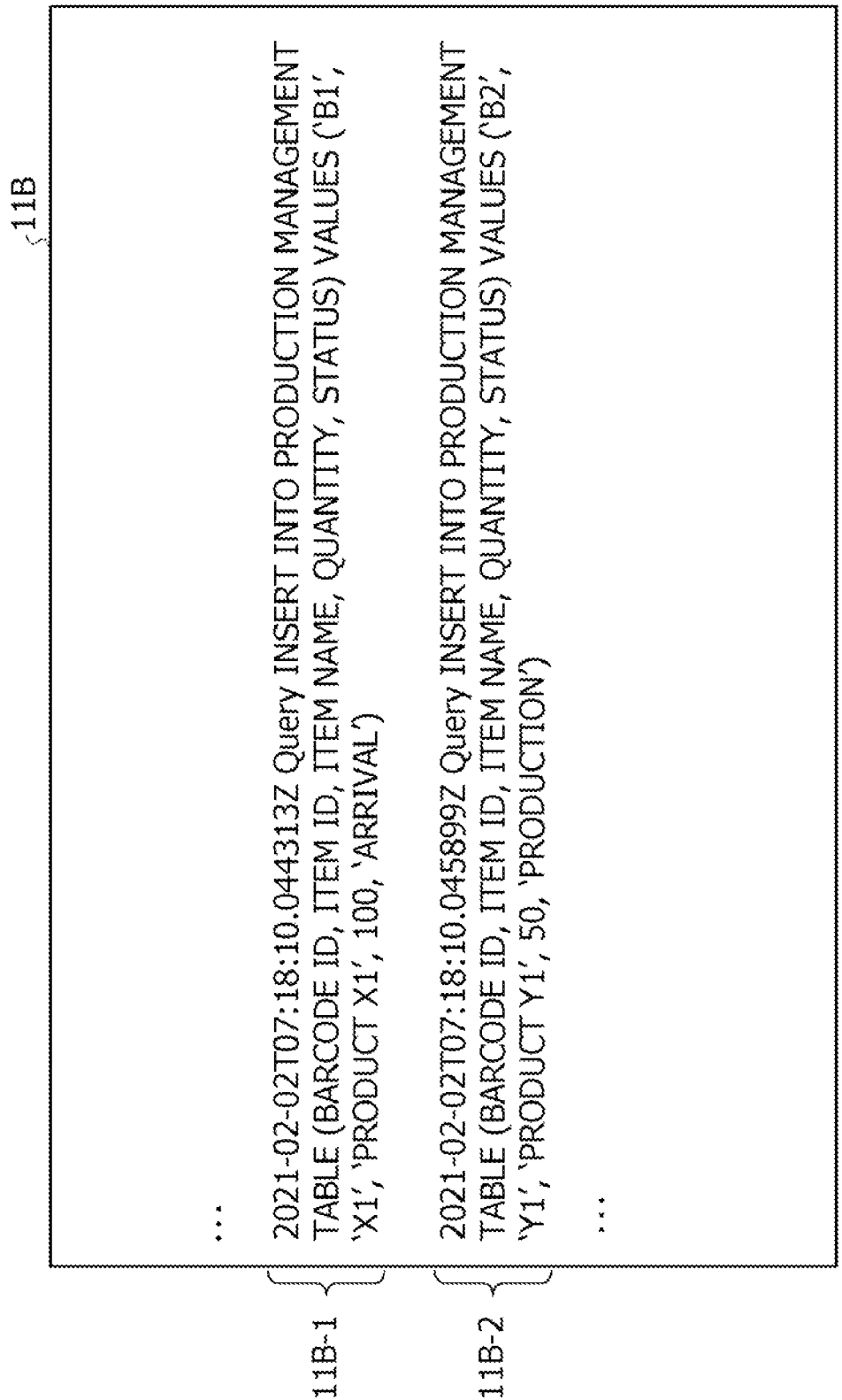
FIG. 23 is a second diagram illustrating exemplary instruction log data according to the second embodiment.

FIG. 23 is a second diagram illustrating exemplary instruction log data 11B according to the second embodiment.

Instruction log data 11B illustrated in FIG. 23 includes instruction log data 11B-1 and instruction log data 11B-2.

This instruction log data 11B is obtained by the instruction log acquisition unit 322 of the history generation unit 320-2 in steps S1610 and 1611 in FIG. 16.

FIGS. 24A and 24B are fourth diagrams illustrating exemplary tables in the second embodiment, and FIG. 25 is a fifth diagram illustrating an exemplary table in the second embodiment.

Each table illustrated in FIGS. 24A to 25 illustrates a state after the history data is stored in the history management system 200 by the management device 300A-2. In other words, for example, each table illustrated in FIGS. 24A to 25 illustrates a state in which the process of steps S1612 to S1619 in FIG. 16 is complete.

A production management table 120B-2 illustrated in FIG. 24A stores the management data with the barcode ID "B1" and the management data with the barcode ID "B2". Furthermore, the status of the management data including the barcode ID "B1" is updated from "production" to "arrival".

The management device 300A-2 first obtains the barcode ID "B1" and the updated value from instruction log data 11B-1 using the data extraction unit 323 of the history generation unit 320-2.

Here, the barcode ID "B1" is obtained as the data ID "B1". Note that the data ID "B1" indicates the barcode ID same as that of the data ID "A1" in the customer system 100A. That is, for example, the data ID "B1" and the data ID "A1" have the same value.

Next, the history generation unit 320 searches the history ID management database 310-2A with the data ID "B1". Here, since the data ID "B1" has the value same as that of the data ID "A1", the history generation unit 320 obtains the history ID "T1" as a search result (see FIGS. 22A and 22B).

Next, the history generation unit 320-2 generates history data in which the history ID "T1" is set as the previous history ID to be associated with the updated value extracted from the instruction log data 11B-1 and new history ID "T2" is assigned. Then, the history generation unit 320-2 stores history data 216 with the history ID "T2" in the history management table 210.

Furthermore, the history generation unit 320 of the management device 300A-2 first obtains the barcode ID "B2" and the updated value from instruction log data 11B-2 using the data extraction unit 323 of the history generation unit 320-2.

Here, the management data of the data ID "B2" is management data newly added to the customer system 100B, and is not present in the history ID management database 310-2.

Therefore, the history generation unit 320-2 generates new history ID "T3", generates history data 217 associated with the updated value extracted from the instruction log data 11B-2, and stores it in the history management table 210.

A history management table 210B illustrated in FIG. 25B stores the history data 216 and the history data 217 generated by the management device 300A-2.

Figure 26:
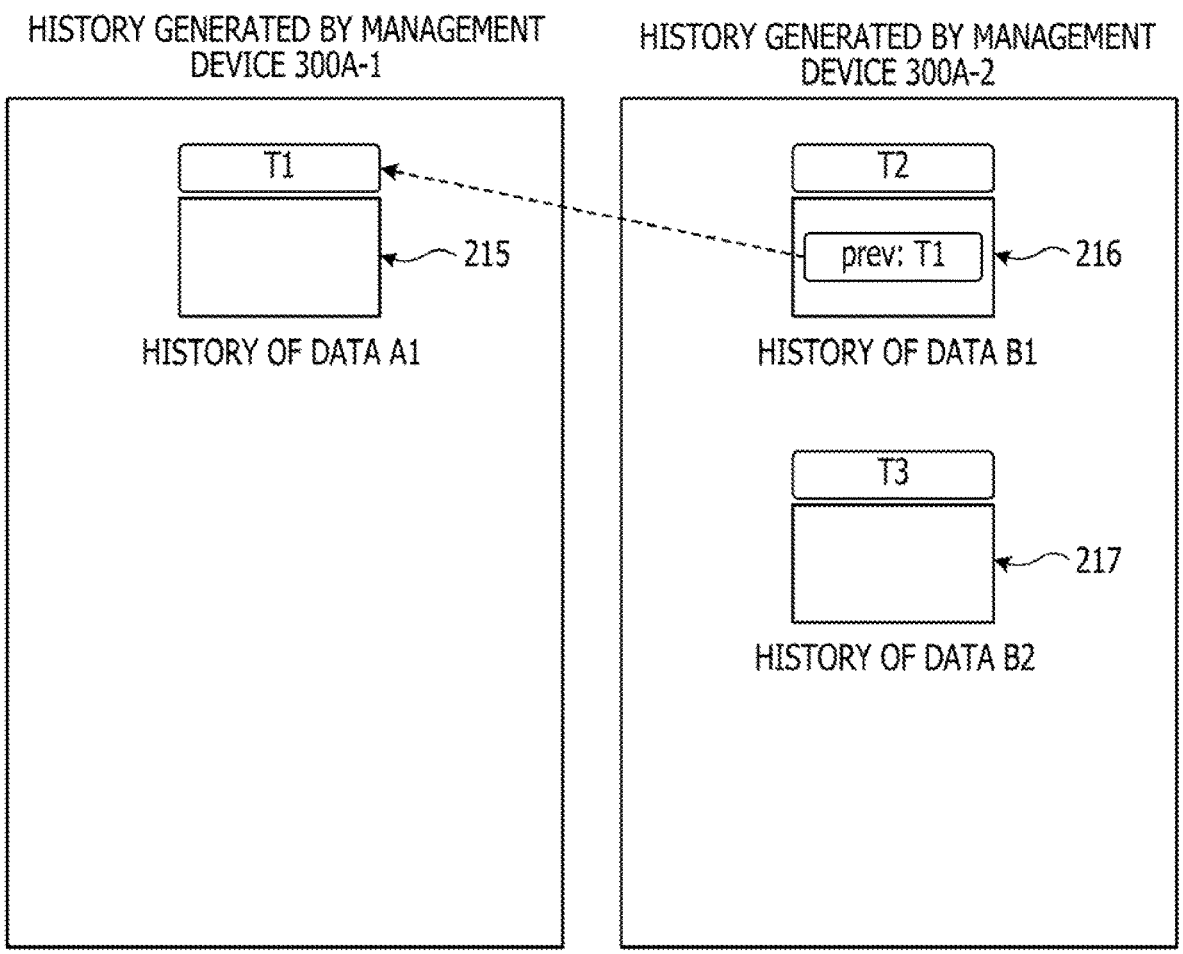
FIG. 26 is a second diagram for explaining the history data stored in the history management table according to the second embodiment.

FIG. 26 is a second diagram for explaining the history data stored in the history management table according to the second embodiment.

In the history management table 210B, the history data "T1" that identifies the history data 215 is included in the history data 216 as previous history data of the history data 216. Therefore, according to the present embodiment, it is possible to associate the history data 215 with the history data 216.

Furthermore, the history data 217 is history data indicating that the management data is newly stored, and thus does not include the previous history ID.

As described above, according to the present embodiment, it becomes possible to link the data IDs used in the respective customer systems 100 even in a case where the tracking object is managed by a plurality of the customer systems 100 having different data ID systems.

Furthermore, while the tracking object is assumed to be managed by the two customer systems 100 in the present embodiment, it is not limited thereto. The tracking object may also be managed by three or more customer systems 100. In this case, data exchange between the two customer systems 100 occurs at multiple locations.

Note that, while the history generation unit 320 and the ID linkage unit 330 have separate functional configurations in the present embodiment, it is not limited thereto. The history generation unit 320 and the ID linkage unit 330 may also be implemented as one functional unit. In other words, for example, the history generation unit 320 and the ID linkage unit 330 may also be integrated as a program.

Third Embodiment

Hereinafter, a third embodiment will be described with reference to the drawings. The third embodiment is different from the first and second embodiments in that a format of the updated value to be included in the history data is set. Accordingly, in the descriptions of the third embodiment below, differences from the first embodiment will be described, and components having functional configurations similar to those in the first embodiment will be denoted by reference signs similar to the reference signs used in the descriptions of the first embodiment, and descriptions thereof will be omitted.

FIG. 27 is a diagram illustrating exemplary environmental data according to the third embodiment. In environmental data 30 illustrated in FIG. 27, in addition to data ID and a table name, a correspondence relationship between an updated value and a history data item and a format of history data are defined.

FIG. 28 is a diagram illustrating exemplary instruction log data according to the third embodiment. Instruction log data 11C illustrated in FIG. 28 indicates instruction log data output from a customer system 100A when management data with data ID "A1" and management data with data ID "A2" are stored in a production management table 120A of the customer system 100A.

In the present embodiment, history data in which an updated value output from the instruction log data 11C is indicated in the format defined by the environmental data 30 is generated.

FIGS. 29A to 29C are diagrams illustrating exemplary tables in the third embodiment. A production management table 120A-2 illustrated in FIG. 29A indicates a state in which the management data with the data ID "A1" and the management data with the data ID "A2" are stored.

A history ID management database 310-113 illustrated in FIG. 29B indicates a state in which ID management data, in which history ID "Tb" and history ID "T2" are associated with the data ID "A1" and the data ID "A2" extracted from the instruction log data 11C, respectively, is stored.

A history management table 210C illustrated in FIG. 29C indicates a state in which history data including the updated value extracted from the instruction log data 11C is stored.

Furthermore, in the example of FIG. 29C, the updated value is stored in the format defined by the environmental data 30. Specifically, for example, in the history data including the history ID "T1", the updated value is stored as a natural language sentence "200 products X1 have been subject to production".

As described above, according to the present embodiment, it becomes possible to generate the history data in the format specified by an administrator of the customer system 100. Therefore, according to the present embodiment, it becomes possible to register history data in any format in a history management system 200 without any modification made to the customer system 100.

Fourth Embodiment

Hereinafter, a fourth embodiment will be described with reference to the drawings. The fourth embodiment is different from the first embodiment in that a table format is set for the environmental data. Accordingly, in the descriptions of the fourth embodiment below, differences from the first embodiment will be described, and components having functional configurations similar to those in the first embodiment will be denoted by reference signs similar to the reference signs used in the descriptions of the first embodiment, and descriptions thereof will be omitted.

FIG. 30 is a diagram illustrating exemplary environmental data according to the fourth embodiment. In environmental data 10A illustrated in FIG. 30, in addition to data ID and a table name, a data structure of the table identified by the table name is defined. Specifically, for example, the data structure of the table indicates data item names included in the table and the order of the data item names.

In the example of FIG. 30, since "barcode ID" to be data ID comes first in "TABLE_FORMAT", the first value of the table identified by the table name is extracted as data ID, and subsequent items are treated as updated values (assumed to be counted in order from the left).

FIG. 31 is a diagram illustrating exemplary instruction log data according to the fourth embodiment. Instruction log data 11D illustrated in FIG. 31 indicates instruction log data output from a customer system 100A when management data with data ID "A1" and management data with data ID "A2" are stored in a production management table 120A of the customer system 100A.

In the present embodiment, history data in which, among values of items defined by the environmental data 10A, the first value "A1" is set as data ID and other values are set as updated values is generated from the instruction log data 11D.

FIGS. 32A to 32C are diagrams illustrating exemplary tables in the fourth embodiment. A production management table 120A-3 illustrated in FIG. 32A indicates a state in which the management data with the data ID "A1" and the management data with the data ID "A2" are stored.

A history ID management database 310-113 illustrated in FIG. 32B indicates a state in which ID management data, in which history ID "T1" and history ID "T2" are associated with the data ID "A1" and the data ID "A2" extracted from the instruction log data 11D, respectively, is stored.

A history management table 210D illustrated in FIG. 32C indicates a state in which history data including the updated values extracted from the instruction log data 11D is stored.

Furthermore, in the example of FIG. 32C, the updated values of the history data include, among the values of the specified items defined by the environmental data 10A, the items and the item values other than the barcode ID. Specifically, for example, in the history data including the history ID "T1", the updated values are ""item ID": "X1", "item name": "product X1", "quantity": "200", "status": "production"".

As described above, according to the present embodiment, it becomes possible to generate history data only by setting items to be included in a table to be monitored without specifying item names to be updated values in environmental data. Therefore, according to the present embodiment, it becomes possible to easily set the environmental data.

The embodiments are not limited to the disclosed embodiment, and various modifications and changes can be made without departing from the scope of claim.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a management program that causes a processor included in a computer to execute a process, the process comprising:
   extracting data identification information that identifies monitoring target data from instruction log data, the instruction log data being recorded operation for the monitoring target data to be monitored;
   extracting an updated value in the monitoring target data from the instruction log data;
   storing, in a database, history data that includes the extracted data identification information, the extracted updated value, and history identification information that identifies the history data, the history data indicating a history of the operation for the monitoring target data; and outputting the history data to an external system, the storing of the history data includes:

searching for, in the database based on the extracted data identification information, the history data that corresponds to the extracted data identification information, and where the history data that corresponds to the extracted data identification information is detected in the database, adding as a previous history identification information, to the history data, the history identification information included in the searched history data.

2. The non-transitory computer-readable storage medium according to claim 1, wherein the extracting includes extracting the data identification information and the updated value from the instruction log data based on environmental data that defines a data item to be included in the history data, the environmental data being input.

3. The non-transitory computer-readable storage medium according to claim 2, wherein the environmental data defines a correspondence relationship between the updated value and the data item to be included in the history data and a format of the history data.

4. The non-transitory computer-readable storage medium according to claim 2, wherein the environmental data defines a data structure of a table that stores the monitoring target data.

5. A management method comprising:

extracting data identification information that identifies monitoring target data from instruction log data, the instruction log data being recorded operation for the monitoring target data to be monitored;

extracting an updated value in the monitoring target data from the instruction log data;

storing, in a database, history data that includes the extracted data identification information, the extracted updated value, and history identification information that identifies the history data, the history data indicating a history of the operation for the monitoring target data; and outputting the history data to an external system, the storing of the history data includes:

searching for, in the database based on the extracted data identification information, the history data that corresponds to the extracted data identification information, and where the history data that corresponds to the extracted data identification information is detected in the database, adding as a previous history identification information, to the history data, the history identification information included in the searched history data.

6. A management apparatus comprising:

a memory; and a processor coupled to the memory and configured to:

extract data identification information that identifies monitoring target data from instruction log data, the instruction log data being recorded operation for the monitoring target data to be monitored;

extract an updated value in the monitoring target data from the instruction log data;

store, in a database stored in the memory, history data that includes the extracted data identification information, the extracted updated value, and history identification information that identifies the history data, the history data indicating a history of the operation for the monitoring target data; and output the history data to an external system, the storing of the history data includes:

searching for, in the database based on the extracted data identification information, the history data that corresponds to the extracted data identification information, and where the history data that corresponds to the extracted data identification information is detected in the database, adding as a previous history identification information, to the history data, the history identification information included in the searched history data.

* * * * *